(12) United States Patent
Kobayashi

(10) Patent No.: US 8,421,917 B2
(45) Date of Patent: Apr. 16, 2013

(54) IMAGE PROCESSING APPARATUS AND METHOD OF CONTROLLING THE SAME

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1167 days.

(21) Appl. No.: 12/186,582

(22) Filed: Aug. 6, 2008

(65) Prior Publication Data

US 2009/0040374 A1 Feb. 12, 2009

(30) Foreign Application Priority Data

Aug. 8, 2007 (JP) ................. 2007-207181

(51) Int. Cl.
*H04N 7/01* (2006.01)
*H04N 11/20* (2006.01)

(52) U.S. Cl. ........ 348/448; 348/441; 348/447; 348/458; 348/497; 348/607

(58) Field of Classification Search .................. 348/441, 348/447–448, 458, 497, 607
See application file for complete search history.

(56) References Cited

U.S. PATENT DOCUMENTS

| | | | | |
|---|---|---|---|---|
| 6,442,203 B1 * | 8/2002 | Demos | ...... | 375/240.16 |
| 6,477,279 B2 | 11/2002 | Go | ...... | 382/240 |
| 6,900,846 B2 | 5/2005 | Lee et al. | ...... | 348/459 |
| 7,098,959 B2 | 8/2006 | Mishima et al. | ...... | 348/459 |
| 7,116,372 B2 | 10/2006 | Kondo et al. | ...... | 348/448 |
| 7,180,548 B2 | 2/2007 | Mishima et al. | ...... | 348/441 |
| 8,077,258 B2 * | 12/2011 | Take et al. | ...... | 348/448 |
| 8,085,848 B2 | 12/2011 | Kurata | ...... | 375/240.16 |
| 2002/0015104 A1 | 2/2002 | Itoh et al. | ...... | 348/459 |
| 2004/0153581 A1 * | 8/2004 | Nakaya et al. | ...... | 710/1 |
| 2004/0246374 A1 | 12/2004 | Mishima et al. | ...... | 348/441 |
| 2005/0163220 A1 | 7/2005 | Takakura et al. | ...... | 375/240.16 |
| 2006/0119617 A1 * | 6/2006 | Toyooka et al. | ...... | 345/619 |
| 2006/0152443 A1 | 7/2006 | Song et al. | ...... | 345/63 |
| 2006/0227249 A1 | 10/2006 | Chen et al. | ...... | 348/631 |
| 2006/0239294 A1 | 10/2006 | Wogsberg | ...... | 370/466 |

(Continued)

FOREIGN PATENT DOCUMENTS

| CN | 1804966 A | 7/2006 |
|---|---|---|
| CN | 1848234 A | 10/2006 |

(Continued)

OTHER PUBLICATIONS

U.S. Office Action dated Jan. 18, 2012; U.S. Appl. No. 12/186,585.

*Primary Examiner* — Justin Shepard
*Assistant Examiner* — Charles N Hicks
(74) *Attorney, Agent, or Firm* — Fitzpatrick, Cella, Harper & Scinto

(57) ABSTRACT

This invention enables, for example, reduction of motion blur in a hold-type display device and reduce flicker in an impulse-type display device by a simple process. For this purpose, an LPF filters a frame of input image data (A[i]) to generate low-frequency image data (L). A subtractor and an adder generate high-frequency image data (SH). Another adder adds the low-frequency image data (L) from a delay circuit to subsequent low-frequency image data. A divider halves the sum to generate low-frequency averaged image data (SL). A switch alternately outputs the high-frequency image data (SH) and the low-frequency image data (SL) every time a frame of image data is input. As a result, the apparatus of this invention can generate output image data having a frame rate twice that of the input image data.

17 Claims, 32 Drawing Sheets

U.S. PATENT DOCUMENTS

| | | | |
|---|---|---|---|
| 2006/0256238 A1 | 11/2006 | Mishima et al. | 348/459 |
| 2009/0002559 A1 | 1/2009 | Poon | 348/620 |
| 2009/0040376 A1 | 2/2009 | Kobayashi | 348/452 |

FOREIGN PATENT DOCUMENTS

| | | |
|---|---|---|
| EP | 1 164 792 A2 | 12/2001 |
| EP | 1 708 488 A2 | 10/2006 |
| JP | 06-70288 | 3/1994 |
| JP | 2002-351382 | 12/2002 |
| JP | 2004-159294 | 6/2004 |
| JP | 2004-297719 | 10/2004 |
| KR | 1020010111740 A | 12/2001 |

\* cited by examiner

F I G. 25

| | FIRST SUB-FRAME | SECOND SUB-FRAME | THIRD SUB-FRAME | FOURTH SUB-FRAME | FIFTH SUB-FRAME |
|---|---|---|---|---|---|
| H COMPONENT GH : | 0 | 0.5 | 4.0 | 0.5 | 0 |
| M COMPONENT GM : | 0 | 1.5 | 2.0 | 1.5 | 0 |
| L COMPONENT GL : | 1 | 1 | 1 | 1 | 1 |

DISTRIBUTION RATIO FOR SUB-FRAMES

FIG. 28

| INPUT IMAGE | A[i-1] | | A[i] | | A[i+1] | | A[i+2] | |
|---|---|---|---|---|---|---|---|---|
| OUTPUT IMAGE | SH[i-2] | SL[i-2] | SH[i-1] | SL[i-1] | SH[i] | SL[i] | SH[i+1] | SL[i+1] |
| COMPONENTS CORRESPONDING TO A[i-2] | 2H[i-2] L[i-2] | L[i-2]/2 | | | | | | |
| COMPONENTS CORRESPONDING TO A[i-1] | | L[i-1]/2 | 2H[i-1] L[i-1] | L[i-1]/2 | | | | |
| COMPONENTS CORRESPONDING TO A[i] | | | | L[i]/2 | 2H[i] L[i] | L[i]/2 | | |
| COMPONENTS CORRESPONDING TO A[i+1] | | | | | | L[i+1]/2 | 2H[i+1] L[i+1] | L[i+1]/2 |
| COMPONENTS CORRESPONDING TO A[i+2] | | | | | | | | L[i+2]/2 |
| SUM OF COMPONENTS (BREAKDOWN OF OUTPUT IMAGE) | 2H[i-2] +L[i-2] | L[i-2]/2 +L[i-1]/2 | 2H[i-1] +L[i-1] | L[i-1]/2 +L[i]/2 | 2H[i] +L[i] | L[i]/2 +L[i+1]/2 | 2H[i+1] +L[i+1] | L[i+1]/2 +L[i+2]/2 |

FIG. 29

| | FIRST SUB-FRAME | SECOND SUB-FRAME | THIRD SUB-FRAME |
|---|---|---|---|
| H COMPONENT GH : | 0 | 2.0 | 0 |
| L COMPONENT GL : | 0.5 | 1.0 | 0.5 |

DISTRIBUTION RATIO FOR SUB-FRAMES

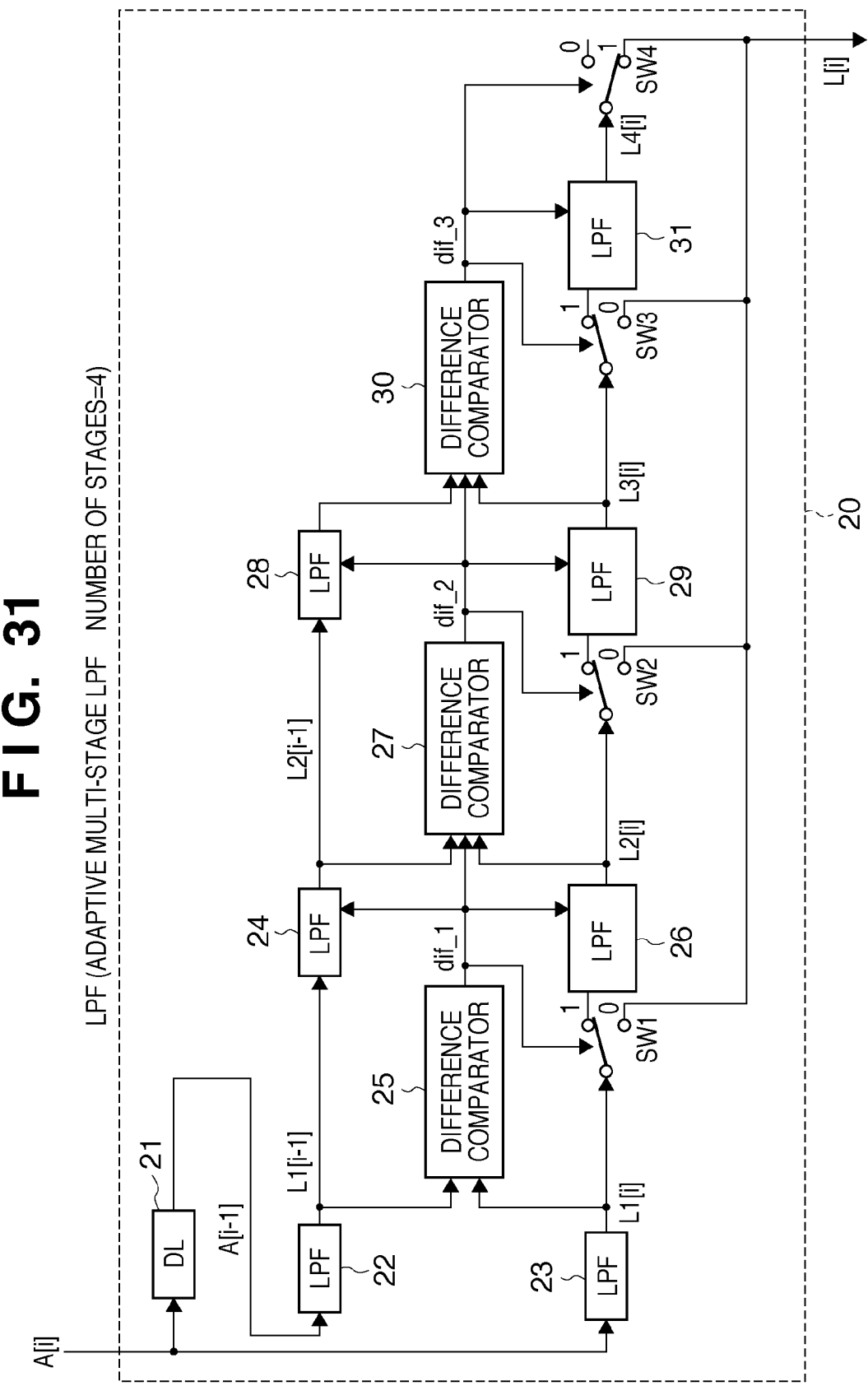
F I G. 31

IMAGE PROCESSING APPARATUS AND METHOD OF CONTROLLING THE SAME

BACKGROUND OF THE INVENTION

1. Field of the Invention

The present invention relates to an image processing apparatus for converting moving image data having a first frame rate into moving image data having a higher frame rate, and a method of controlling the same.

2. Description of the Related Art

Conventionally, a CRT has been synonymous with a moving image display device for, for example, television. However, so-called liquid crystal displays, plasma displays, and FED displays have been put into practical use in recent years. That is, there are now displays of various types.

The displays of these types adopt different display methods. For example, display devices based on a liquid crystal device (e.g., direct-view-type liquid crystal display device, liquid crystal rear projector, and liquid crystal front projector) use many scanning methods. In any case, the light output period in each pixel portion occupies a large part of the display period of one frame. For this reason, such a display device is called a hold-type display device.

On the other hand, in, for example, a CRT or FED, light is output in each pixel portion once in a frame. The light emission time is much shorter than the frame display period and is normally 2 msec or less. For this reason, such a display device is called an impulse-type display device.

There also exist a so-called plasma display and a field sequential display which are of types different from the above-described classes.

The display methods of the respective types have the following features.

(1) Hold-Type Display Device

A display device of this type emits light during a large part of a frame period. Hence, the temporal imbalance of light intensity is small, and flicker is rarely observed. Additionally, pursuit (i.e., the pursuit by the eyes of a moving portion of a moving image) makes motion blur relatively large in accordance with the length of the light emission period in a frame. "Motion blur" here is different from that caused by the response characteristic of a display device.

(2) Impulse-Type Display Device

A display device of this type emits light in a very short time during a frame period. Hence, the temporal imbalance of light intensity is large, and flicker synchronous with a frame is observed. However, motion blur in pursuit is rarely observed. It is therefore possible to obtain a resolution almost equal to that of a still portion.

In general, the light emission period of a display device changes depending on the display method and display device. The above-described types (1) and (2) are diametrically opposed in terms of the light emission period. The longer the light emission period (corresponding to the hold time) in each method is, the larger the motion blur in pursuit is. The shorter the light emission period is, the smaller the motion blur is. That is, the light emission period and the magnitude of motion blur are almost proportional to each other. On the other hand, concerning flicker synchronous with a frame, the longer the light emission period is, the smaller the flicker observed. The shorter the light emission period is, the larger the observed flicker. That is, the light emission period and flicker have a trade-off relationship.

A solution to the two problems is multiplying the frame frequency by N. In many case, N=2. That is, the rate is doubled. When the frame frequency is doubled, the light emission period in each double-rate frame is halved. This also almost halves the motion blur. Regarding flicker as well, if an initial frame frequency of 60 Hz is doubled to 120 Hz, the frequency of flicker falls outside the response characteristic of human eyes. Hence, no flicker is observed.

As described above, doubling the frame frequency (more generally speaking, multiplying the frame frequency by N) has a large effect but poses a new problem.

For example, when the frame frequency of an original image signal is 60 Hz, the image information is updated every 1/60 sec. If the frame frequency is doubled to display image data at 120 Hz, necessary image information is missing every other frame. As a measure, identical images are displayed, for example, twice if the frame frequency is doubled. This solves flicker but cannot improve motion blur in the original image. In an impulse-type display device, doubled images are observed in pursuit (this phenomenon will be referred to as "double-blurring" hereinafter).

To reduce the motion blur or double-blurring and prevent flicker, two methods are mainly used to double the frame frequency.

The first method detects the motion of an object in an original image and estimates images between two frames. This is generally called an intermediate image generation method by motion compensation. In this first method, an estimation error occurs under a specific condition. In addition, the amount of computation required is extremely high.

In the second method, a filter process is first performed for each frame of an input image to separate a spatial high-frequency component strongly related to motion blur and a spatial low-frequency component strongly related to flicker. The spatial high-frequency component is concentrated in one sub-frame (one of the two double-rate frames corresponding to the original frame). The spatial low-frequency component is distributed to both sub-frames (both of the two double-rate frames corresponding to the original frame).

In this specification, this second method will be called a "method of separating an image into spatial frequencies and distributing them to sub-frames for display".

As the "method of separating an image into spatial frequencies and distributing them to sub-frames for display", Japanese Patent Laid-Open No. 6-70288 (to be referred to as patent reference 1 hereinafter), Japanese Patent Laid-Open No. 2002-351382 (to be referred to as patent reference 2 hereinafter), and U.S. Pre-Grant Publication No. 2006/0227249A1 (to be referred to as patent reference 3 hereinafter) are known.

SUMMARY OF THE INVENTION

The present invention can further improve the latter (second method) with a relatively light processing load.

In examining the "method of separating an image into spatial frequencies and distributing them to sub-frames for display", two problems are posed.

The first problem is that a display image in actual pursuit has distortion. The second problem is that it is impossible to make full use of the dynamic range of a display device.

The first problem is supposed to be caused when a spatial high-frequency component and a spatial low-frequency component generated from each frame of an input image are distributed to sub-frames, and the temporal centers of gravity of their components shift in display.

In pursuit, the display time of each image corresponds to the spatial position of the image observed in pursuit. If the temporal center of gravity shifts, the spatial center of gravity shifts in the image observed in pursuit. Even in an image observed in pursuit, if the spatial center of gravity of the spatial high-frequency component and that of the spatial low-frequency component have a shift relative to one another, an image having distortion such as ghosting or tail-blurring is obtained, as in a normal image.

In patent reference 1, the rate of an original image is doubled, and the spatial high-frequency component of one sub-frame (one of the two corresponding double-rate frames) is limited, and the presence/absence of the limitation is controlled in accordance with the motion of the image. Hence, when the high-frequency component is limited, its temporal center of gravity shifts to the sub-frame in which the high-frequency component is not limited. As a result, an image in which the temporal center of gravity of the high-frequency component and that of the low-frequency component of the input image have a shift is displayed, and ghosting or tail-blurring may be observed in pursuit.

In patent reference 2, the rate of an original image is doubled, and the spatial high-frequency components of two double-rate frames (two sub-frames corresponding the frame of the input image) are increased or decreased in accordance with the motion. In this case as well, the temporal center of gravity of the spatial high-frequency component shifts to the sub-frame in which the high-frequency component is increased. Hence, ghosting or tail-blurring may be observed in pursuit, like the above-described case.

In patent reference 3, the rate of an original image is doubled, and the spatial high-frequency component of one sub-frame is increased, and that of the other sub-frame is decreased by the same amount. In this case as well, the temporal center of gravity of the spatial high-frequency component shifts to the sub-frame in which the high-frequency component is increased. Hence, ghosting or tail-blurring may be observed in pursuit, like the above-described case.

The second problem, that it is impossible to make full use of the dynamic range of a display device, will be described below.

When the display level of one sub-frame is moved to the other sub-frame, the maximum display intensity of the sub-frame whose display level has risen is limited. At this time, the display intensity of the sub-frame with the lower display level has not reached the maximum value. For this reason, it is impossible to use the dynamic ranges of the two sub-frames at maximum.

The present invention has been made in consideration of the above-described problems, and has as its object to provide a technique of mitigating at least the first and/or second problems using a simple arrangement.

For example, the present invention to solve the first problem has the following arrangement.

According to one aspect of the present invention, there is provided an image processing apparatus configured to output moving image data which is input at m frames per unit time as output moving image data at N×m (N≧2) frames per unit time, comprises:

a filter unit configured to separate image data from an input frame of interest into spatial high-frequency component image data and spatial low-frequency component image data;

a storage unit configured to store the spatial high-frequency and spatial low-frequency component image data obtained by the filter unit;

a read unit configured to read the spatial high-frequency component image data and the spatial low-frequency component image data from the storage unit N times;

a multiplication unit configured to, multiply the spatial high-frequency component image data and the spatial low-frequency component image data by predetermined multiplier coefficients which are set to make a temporal center of gravity of the spatial high-frequency component image data match that of the spatial low-frequency component image data and make temporal distribution of the spatial high-frequency component image data smaller than that of the spatial low-frequency component image data;

an addition unit (3) configured to add the spatial high-frequency component image data and the spatial low-frequency component image data after multiplication by the multiplication unit every time the data is read; and an output unit configured to output the summed image data from the addition unit.

According to another aspect of the present invention, there is provided an image processing apparatus configured to receive input moving image data at m frames per unit time and output moving image data at 2 m frames per unit time, comprises:

a receiving unit configured to receive input image data of each frame;

a filter unit configured to separate image data of an input frame of interest into spatial high-frequency component image data and spatial low-frequency component image data;

a storage unit configured to store the input image data, the spatial high-frequency component image data, and the spatial low-frequency component image data;

a calculation unit configured to calculate low-frequency averaged image data that is an averaged value of low-frequency component image data of an input frame temporally adjacent the frame of interest and the low-frequency component image data of the frame of interest stored in the storage unit;

a generation unit configured to generate high-frequency emphasized image data based on the low-frequency component image data and the high-frequency component image data; and an output unit configured to output, sequentially for each frame, the high-frequency emphasized image data and the low-frequency averaged image data obtained by the calculation unit.

According to still another aspect of the present invention, there is provided an image processing apparatus configured to output moving image data which is input at m frames per unit time as output moving image data containing N×m (N≧2) frames per unit time, comprises:

filter unit configured to separate input moving image data of a frame of interest into R (R≧2) spatial frequency band component images;

storage unit configured to store the R image data components obtained by the filter unit;

reading unit configured to read the R image data components from the storage unit N times;

multiplication unit configured to multiply the R image data components by predetermined multiplier coefficients which are set to make the temporal centers of gravity of the R image data components match, and make the temporal distribution of the R image data components smaller in ascending order of the spatial frequency of the component image;

addition unit configured to adds the R spatial frequency band image data components after multiplication by the multiplication unit every time the reading reads the R spatial frequency band image data components; and output unit which outputs the summed image data from the addition unit.

According to yet another aspect of the present invention, there is provided an image processing apparatus configured to output moving image data which is input at m frames per unit time as output moving image data at N×m (N≧2) frames per unit time, comprises:

filter unit configured to separate an image of a frame of interest into a spatial high-frequency image data component and a spatial low-frequency image data component;

storage unit configured to store each spatial frequency image data component obtained by the filter unit;

reading unit configured to read the spatial high-frequency image data component and the spatial low-frequency image data component from the storage unit N times;

multiplication unit configured to multiply the spatial high-frequency image data component and the spatial low-frequency image data component by predetermined multiplier coefficients which are set to allocate the low-frequency image data component to a larger number of frames than the high-frequency image data component;

addition unit which adds the spatial high-frequency image data component and the spatial low-frequency image data component after multiplication by the multiplication unit every time the reading unit reads out the spatial high-frequency image data component and the spatial low-frequency image data component; and output unit configured to output the summed image data from the addition unit.

According to still yet another aspect of the present invention, there is provided a method of controlling an image processing apparatus which outputs moving image data input at m frames per unit time as output moving image data at N×m (N≧2) frames per unit time, the method comprises:

separating an image of a frame of interest into a spatial high-frequency image data component and a spatial low-frequency image data component;

storing each spatial frequency image data component obtained in the filtering step in a storage unit;

reading the spatial high-frequency image data component and the spatial low-frequency image data component from the storage unit N times;

multiplying the spatial high-frequency image data component and the spatial low-frequency image data component by predetermined multiplier coefficients which are set to make a temporal center of gravity of the spatial high-frequency image data component match that of the spatial low-frequency image data component and make the temporal distribution of the spatial high-frequency image data component smaller than that of the spatial low-frequency image data component;

adding the spatial high-frequency image data component and the spatial low-frequency image data component after multiplication every time the spatial high-frequency image data component and the spatial low-frequency image data component are read; and outputting the image data summed in the adding step.

According to yet still another aspect of the present invention, there is provided a method of controlling an image processing apparatus which inputs moving image data containing m frames per unit time and outputs moving image data containing 2 m frames per unit time, the method comprises:

inputting image data of each frame;

separating image data of an input frame of interest into a spatial high-frequency image data component and a spatial low-frequency image data component;

storing a low-frequency image data component of an immediately preceding frame of the frame of interest in a storage unit;

calculating a low-frequency image data average that is an averaged value of the low-frequency image data component of a frame input next to the frame of interest obtained in the filtering step and the low-frequency image data component stored in the storage unit; and sequentially outputting for each frame, high-frequency emphasized image data generated based on the low-frequency image data component and the high-frequency image data component, and the low-frequency image data average.

According to still yet another aspect of the present invention, there is provided a method of controlling an image processing apparatus which outputs moving image data input at m frames per unit time as output moving image data at N×m (N≧2) frames per unit time, the method comprises:

separating the input moving image data of a frame of interest into R (R≧2) spatial frequency band component images;

storing the R image data components obtained in a storage unit;

reading the R image data component from the storage unit N times;

multiplying the R image data components by predetermined multiplier coefficients which are set to make the temporal centers of gravity of the R image data components match, and make the temporal distribution of the R image data components smaller in ascending order of the spatial frequency of the component image;

adding the R spatial frequency band image data components after multiplication every time the R spatial frequency band image data components are read; and outputting the summed image data from the addition.

According to yet still another aspect of the present invention, there is provided a method of controlling an image processing apparatus which outputs moving image data input at m frames per unit time as output moving image data containing N×m (N≧2) frames per unit time, the method comprises:

separating an input image of a frame of interest into a spatial high-frequency image data component and a spatial low-frequency image data component;

storing each spatial frequency image data component obtained in a storage unit;

reading the spatial high-frequency image data component and the spatial low-frequency image data component from the storage unit N times;

multiplying the spatial high-frequency image data component and the spatial low-frequency image data component by predetermined multiplier coefficients which are set to allocate the low-frequency image data component to a larger number of frames than the high-frequency image data component;

adding the spatial high-frequency image data component and the spatial low-frequency image data component after multiplication every time the spatial high-frequency image data component and the spatial low-frequency image data component are read; and outputting the image data summed in the addition.

According to the present invention, it is possible to, for example, reduce motion blur in a hold-type display device and reduce flicker in an impulse-type display device using a simple process. It is also possible to suppress distortion such as ghosting or tail-blurring in pursuit. The invention also enables prevention of any adverse effects on image quality caused by a decrease in brightness or saturation of the level of one sub-frame.

Further features of the present invention will become apparent from the following description of exemplary embodiments (with reference to the attached drawings).

BRIEF DESCRIPTION OF THE DRAWINGS

FIG. 25 is a view showing gain coefficients in each band of five sub-frames in 5×-rate playback according to the fourth embodiment;

FIG. 28 is a table showing a frame relationship according to the first embodiment;

FIG. 29 is a view showing the distribution ratio for sub-frames according to the first embodiment;

FIG. 31 is a block diagram of an adaptive multi-stage (4-stage) LPF according to the second embodiment, which performs the filtering process for an entire image.

DESCRIPTION OF THE EMBODIMENTS

The embodiments of the present invention will now be described with reference to the accompanying drawings.

For easy understanding of the embodiments of the present invention, the relevant prior art will be described first with reference to FIGS. 4 to 6.

Figure 4:
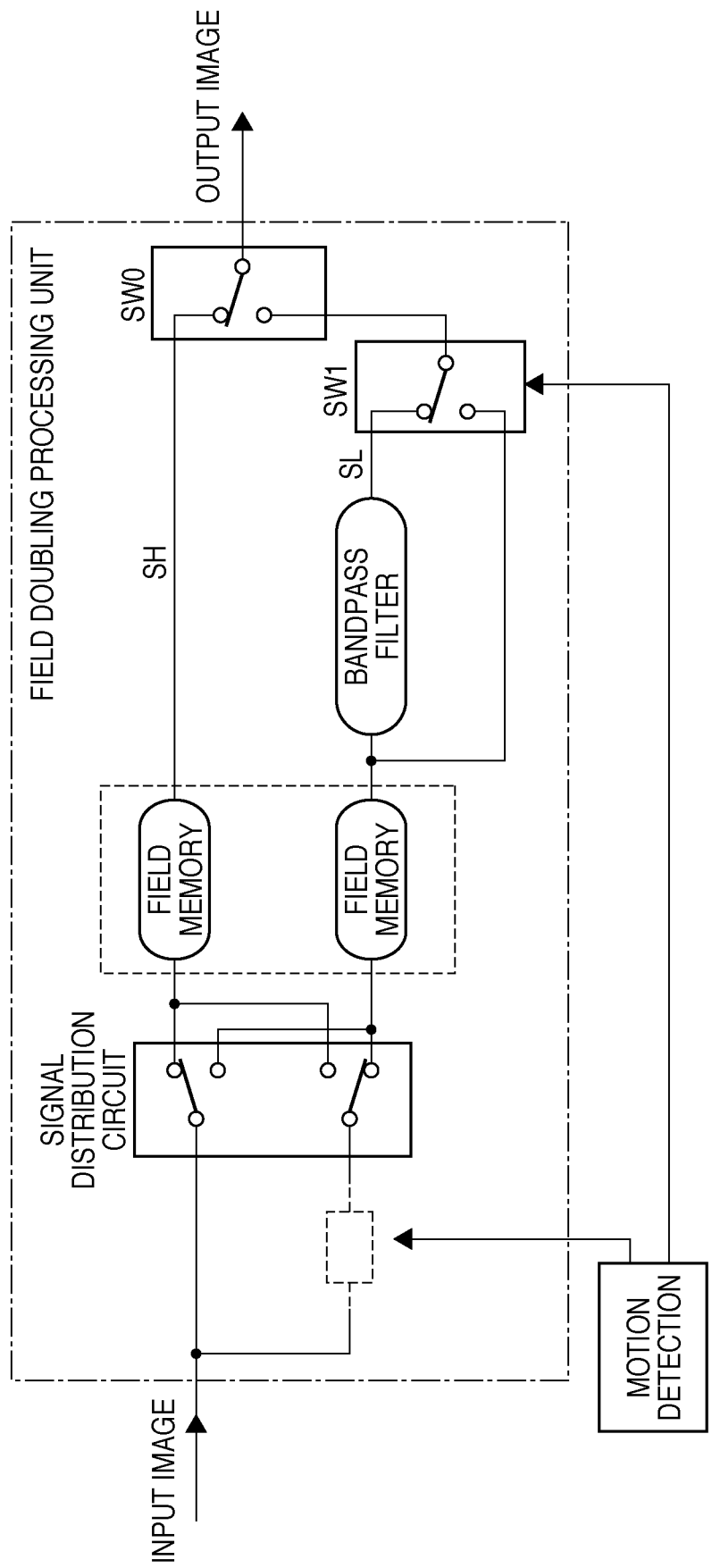
FIG. 4 is a block diagram showing the arrangement of a conventional image processing apparatus.

In the prior art arrangement shown in FIG. 4, input field images are selectively temporarily saved in two field memories and alternately output at double the input rate via a switch SW0, thereby doubling the frame rate of the original signal. At this time, the high-frequency component of the spatial frequency of one sub-frame is suppressed. As a result, the sub-frame (expressed by SL in FIG. 4) contains a relatively small amount of spatial high-frequency component. The other sub-frame (expressed by SH in FIG. 4) contains a relatively large amount of spatial high-frequency component. The spatial high-frequency component is therefore localized in one of the sub-frames of the output image. This reduces motion blur.

Figure 5:
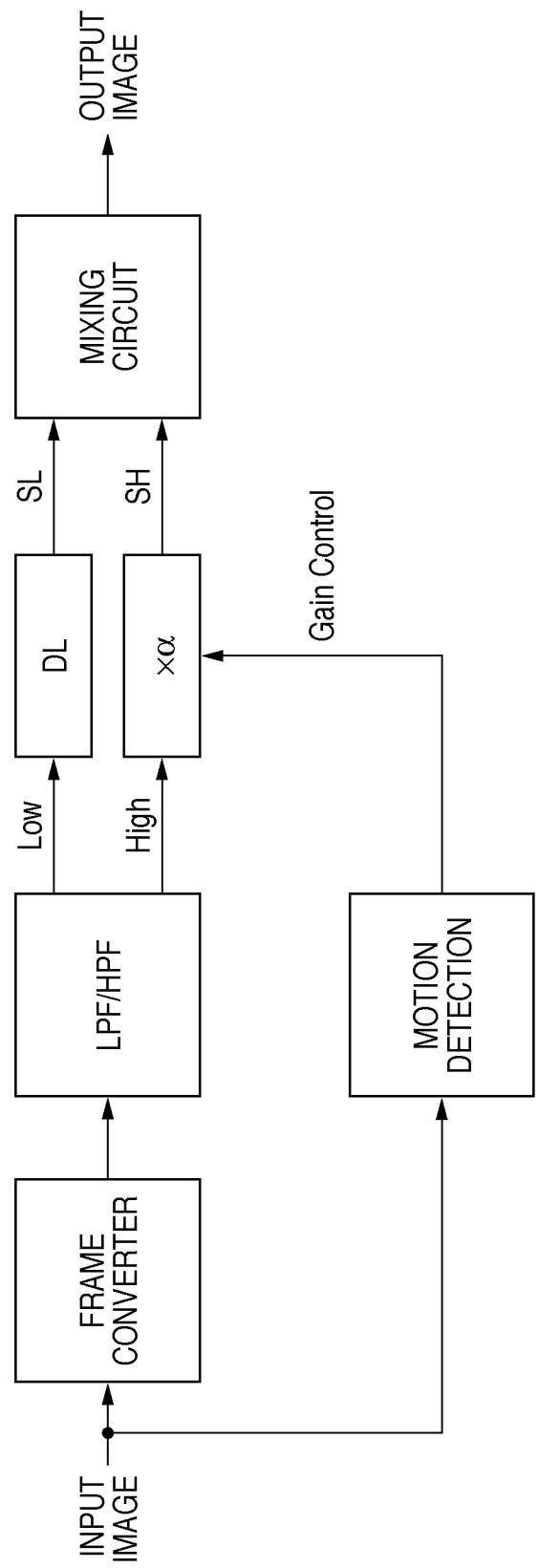
FIG. 5 is a block diagram showing the arrangement of another conventional image processing apparatus.

In another prior art arrangement shown in FIG. 5, a frame converter doubles the frame rate of an input image. A filter LPF/HPF separates the spatial frequency into a spatial low-frequency component, "Low", and a spatial high-frequency component, "High". The high-frequency component High is multiplied by a predetermined gain α for each double-rate frame (or for one of the sub-frames viewed from the input image frame). The polarity of α is changed in every double-rate frame by using α having a positive value in one of the double-rate frames and α having a negative value in the other double-rate frame. If it is determined that the motion of the image is large, the absolute value of α may be increased. The spatial high-frequency component is therefore localized in one double-rate frame (or one sub-frame viewed from the input image) SH. This reduces motion blur.

Figure 6:
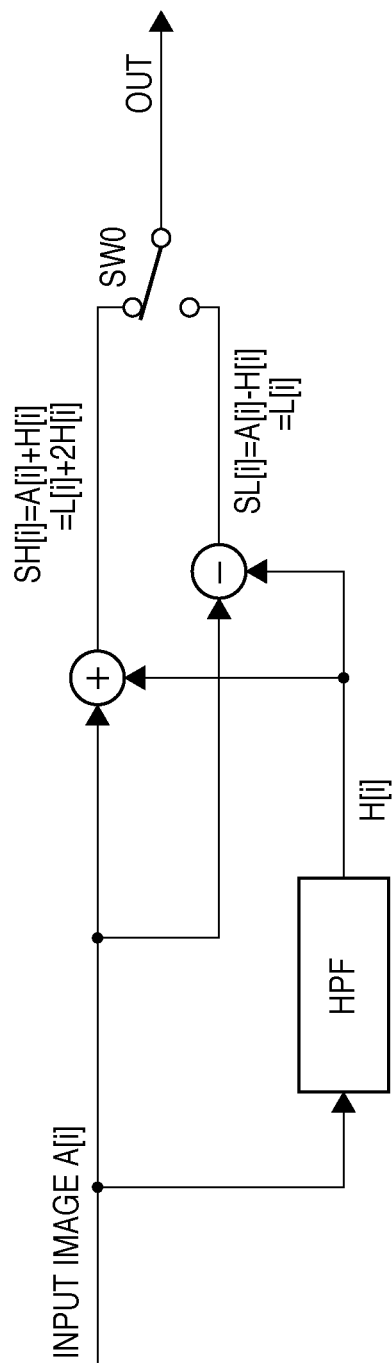
FIG. 6 is a block diagram showing the arrangement of yet another conventional image processing apparatus.

In still another prior art arrangement shown in FIG. 6, an input image A[i] passes through a filter HPF to generate spatial high-frequency component data H[i]. The spatial high-frequency component data H[i] is added to the input image A[i] to generate high-frequency emphasized image data SH[i]. The spatial high-frequency component data H[i] is subtracted from the input image A[i] to generate low-frequency image data SL[i]. These data are switched at a frequency twice the frame frequency of the input image by a switch SW0, thereby outputting a double-rate image in which the spatial high-frequency component is concentrated to one of the double-rate frames (one sub-frame viewed from the input image frame). This reduces motion blur.

In these prior art arrangements, the two corresponding double-rate frames (or one of the sub-frames viewed from the input image), that is, the frames SH and SL, are generated on the basis of one input frame. When, for example, the frame SH is displayed first, and the frame SL is then displayed, the frame SH contains a large amount of spatial high-frequency component of the input image frame. Hence, the spatial high-frequency component shifts forward on a time basis. On the other hand, the spatial low-frequency component is distributed to both the frames SH and SL and does not shift at all on a time basis. Hence, the spatial high-frequency component shifts forward on a time basis relative to the spatial low-frequency component.

When pursuit is done for a moving portion of a moving image, the forward shift on a time basis is equivalent to spatial shift in the moving direction in an image observed in pursuit. Hence, the spatial high-frequency component in the image observed in pursuit shifts in the moving direction relative to the spatial low-frequency component. In this case, an image having ghosting or tail-blurring is observed.

<First Embodiment>

The first embodiment can mitigate the first problem described above. More specifically, the first embodiment can enable the elimination of the relative time shift in display (output) of spatial high-frequency component image data and spatial low-frequency component image data. In the first embodiment, it is therefore possible to prevent or reduce ghosting or tail-blurring in an image observed in pursuit.

Figure 1:
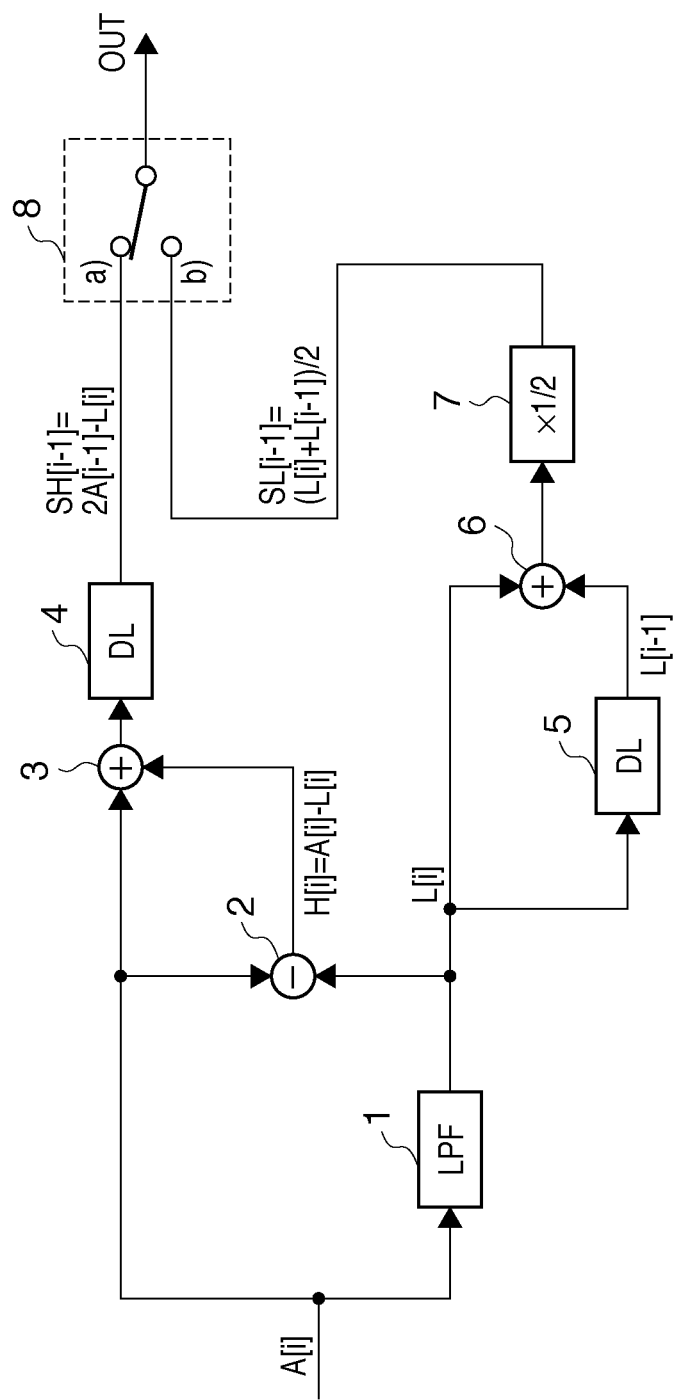
FIG. 1 is a block diagram showing an arrangement of an image processing apparatus according to the first embodiment.

FIG. 1 is a block diagram showing an arrangement of an image processing apparatus according to the first embodiment.

FIG. 1 shows an apparatus which receives each frame of moving image data and generates two sub-frames (double-rate moving image data) from the input moving image data of one frame. The input moving image data of one frame is represented by A[i], and spatial high-frequency component data of the input moving image data A[i] is represented by H[i] (spatial high-frequency data). Spatial low-frequency component data (spatial low-frequency component image data) is represented by L[i]. One of the double-rate frames (or sub-frames) which are alternately output to realize a double-rate image is represented by SH[i], and the other is represented by SL[i]. The "[i]" index notation indicates the ith frame of the input moving image.

A lowpass filter 1 (to be referred to as an LPF 1 hereinafter) is a two-dimensional lowpass filter. This filter does not define a specific function. For example, a Gaussian function is usable. Alternatively, a moving average or a weighted moving average is usable. In the following description, an effective distance that is ½ the maximum value of a filter coefficient is defined as "distance constant value: d". The distance constant value d indicates a wavelength corresponding to a spatial frequency that is equal to a cutoff frequency in limiting the bandwidth of an image by a spatial frequency filter. The unit of d is "pixel".

The LPF 1 first cuts off (filters), from the input image A[i], upper spatial frequencies above a predetermined constant value, thereby generating the spatial low-frequency component data L[i]. A subtractor 2 calculates the spatial high-frequency component data H[i] by subtracting L[i] from the original image data A[i] in accordance with $H[i]=A[i]-L[i]$ An adder 3 adds the high-frequency component data H[i] to the original image data A[i], thereby generating sub-image data (spatial high-frequency emphasized image data) SH[i] containing a large amount of spatial high-frequency components.

$SH[i]=A[i]+H[i]=L[i]+2\times H[i]$

Each of frame delay circuits 4 and 5 delays the current frame by one frame to perform calculation between the current frame and the next frame. The frame delay circuit 4 eliminates the frame shift between a signal input to a terminal a of a switch 8 and a signal input to a terminal b.

An adder 6 adds spatial low-frequency component data L[i−1] generated by the LPF 1 and delayed by one frame to L[i] of the next frame.

A divider 7 calculates an average value by dividing the image data from the adder 6 by "2" and outputs it as low-frequency averaged image data SL[i−1].

$SL[i-1]=\{L[i-1]+L[i]\}/2$

The frame delay circuit 4 delays SH[i] by one frame to generate SH[i−1] so that SH[i] calculated by the adder 3 matches SL[i−1].

The thus generated SH[i−1] and SL[i−1] are selected by the switch 8 at a frequency twice that of the input image frames, and are sequentially output. This enables output of a double-rate image signal containing a spatial high-frequency component localized in one frame. It is therefore possible to realize an image with small motion blur and small flicker.

In the embodiments of the present invention, calculations and definitions are explained for displayed brightness (displayed light intensity) as an example. In the embodiments, a timing chart showing, for example, the waveform of an image expresses brightness along the ordinate. Hence, the present invention is most effective when it is applied to image data defined as data proportional to displayed brightness (displayed light intensity). However, the present invention is not always limited to such a case. The present invention is also applicable to image data in a range generally used (image data having slight nonlinearity between data values and displayed brightness or light intensity). Even in this case, the concept of the present invention approximately holds and provides a sufficiently advantageous effect.

Figure 2:
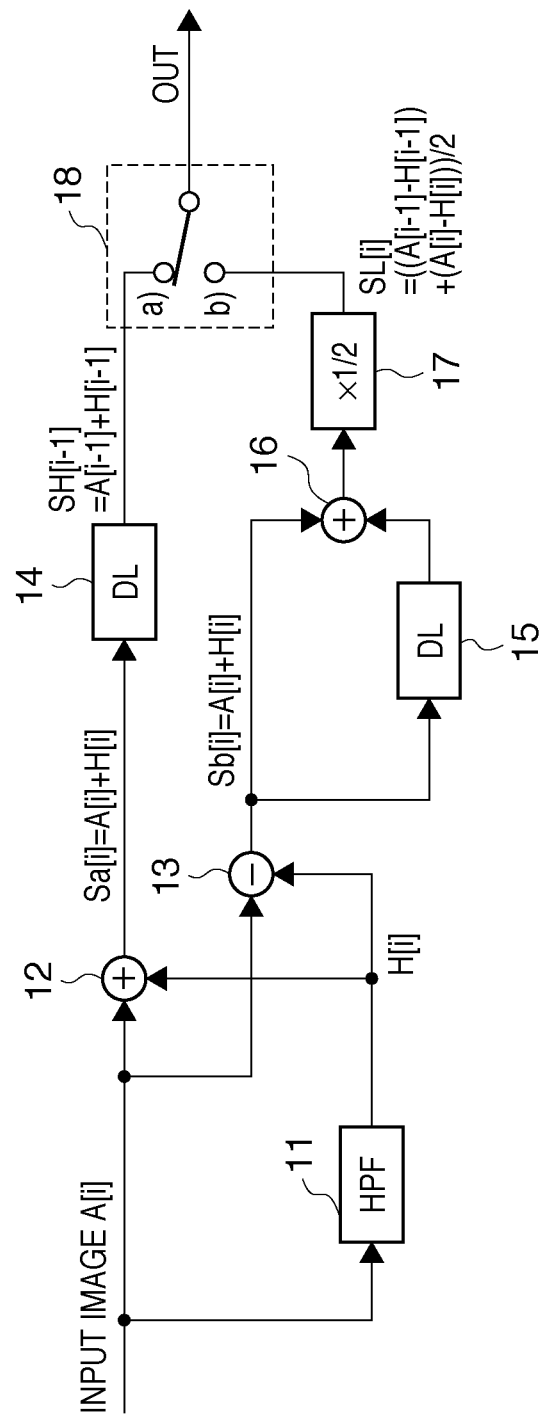
FIG. 2 is a block diagram showing another arrangement of the image processing apparatus according to the first embodiment.

FIG. 1 shows an example using the SH[i−1]. FIG. 2 shows an example in which a circuit arrangement equivalent to that in FIG. 1 is formed using a high pass filter (HPF).

Reference numeral 11 in FIG. 2 denotes a high pass filter (to be referred to as an HPF hereinafter). FIG. 2 shows a circuit arrangement which assumes the LPF 1 in FIG. 1 and the HPF 11 in FIG. 2 have a relationship given by A[i]=H[i]+L[i]. Reference numeral 13 in FIG. 2 denotes a subtractor; 12 and 16, adders; 14 and 15, frame delay circuits; 17, a divider; and 18, a switch. The constituent elements can sufficiently be understood based on the illustrated arrangement, and a detailed description thereof will be omitted.

Figure 3:
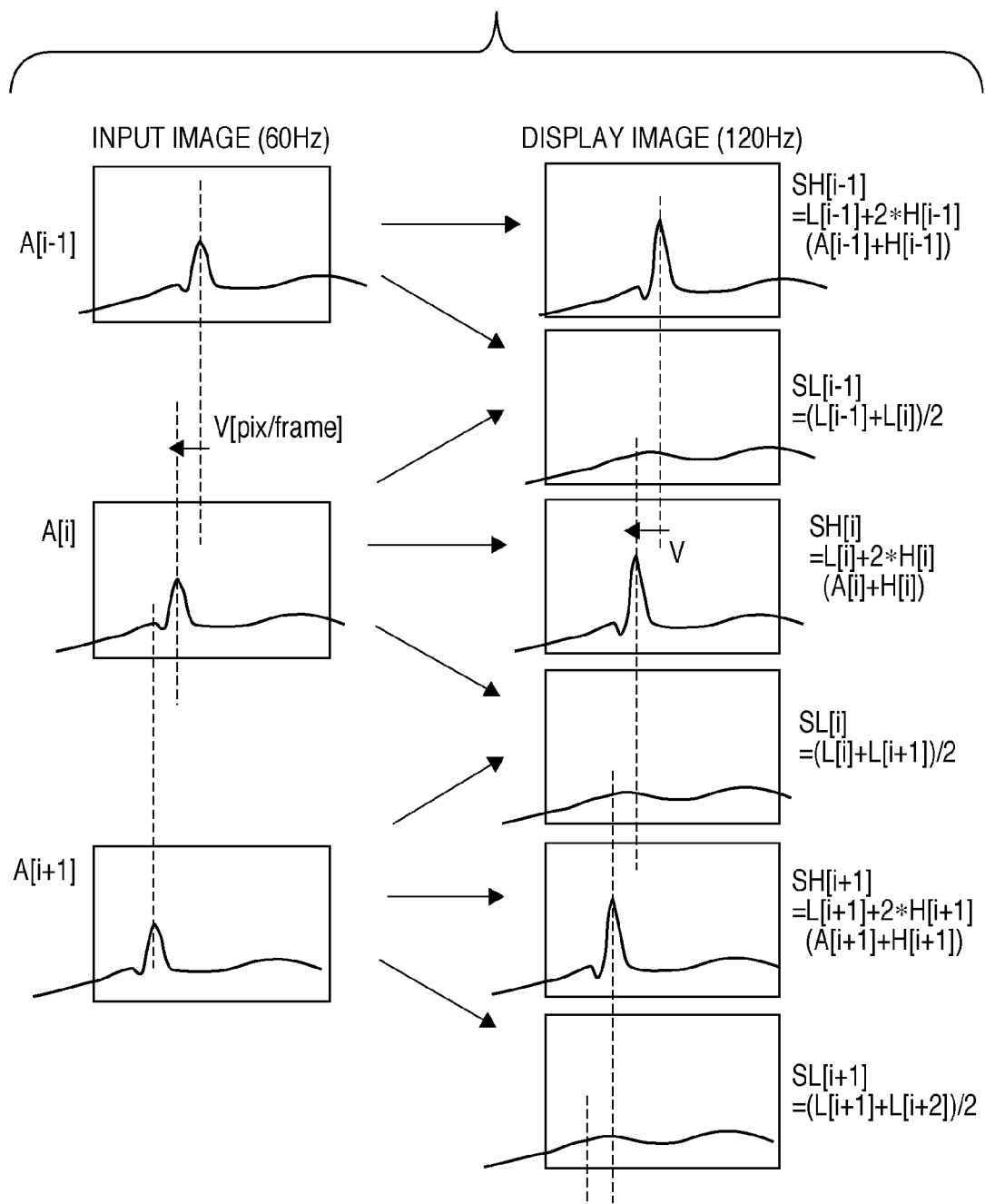
FIG. 3 is a view showing examples of image signal waveforms along a time axis in input frames and double-rate frames according to the first embodiment.

FIG. 3 shows the correspondence relationship between the input image A[i] and the output images SH[i] and SL[i] in the first embodiment. The sequence of frames proceeds with time from the top to the bottom of the Figure. An output image is output with a time delay of at least one frame with respect to a corresponding input image.

The output images SH[i−1], SH[i], and SH[i+1] corresponds to input images A[i−1], A[i], and A[i+1], respectively. The elements of the output images are calculated from the corresponding frames of the input images. On the other hand, for example, constituent elements L[i] and L[i+1] of an output image SL[i] are calculated from A[i] and A[i+1], respectively. SL[i] is the average value of the elements.

With this relationship, ½ of L[i] that is the spatial low-frequency component data of A[i] is output (displayed) as SL[i], and the remaining ¼ components are displayed as SL[i−1] and SL[i].

Hence, the temporal center of gravity of display of L[i] is located at the intermediate point between SL[i−1] and SL[i], that is, at the center of the display period of SH[i]. On the other hand, H[i] that is calculated as the spatial high-frequency component of A[i] is wholly displayed as SH[i]. The temporal center of gravity of display of H[i] is located at the center of the display period of SH[i]. Consequently, the temporal center of gravity of display of L[i] matches that of H[i]. That is, distortion such as ghosting or tail-blurring in an image observed in pursuit can be prevented.

<Order of SH and SL>

This embodiment will be explained assuming that the two sub-frame signals SH[i] and SL[i] corresponding to one input data frame A[i] are output such that they are displayed in that order. For example, FIG. 28 is a table that explicitly shows this order. However, the present invention is not limited to this order, and the order may be reversed. Even in the reversed order, the present invention has the same effect.

The order that outputs SL later, as in the explanation of this embodiment, will be referred to as a "forward order", and the order that outputs SL first will be referred to as a "reverse order" hereinafter.

In the "forward order", SL takes an average value by referring to the low-frequency component of a frame of interest and that of an immediately succeeding frame. Actually, after waiting one frame for the immediately succeeding frame to be input, the average value between the temporarily saved current frame and the newly input frame is calculated. Hence, the output low-frequency image is expressed by $$SL[i-1]=(L[i-1]+L[i])/2$$

In contrast, in the "reverse order", SL takes an average value by referring to the low-frequency component of a frame of interest and that of an immediately preceding frame. Hence, the output low-frequency image is expressed by $$SL[i]=(L[i]+L[i-1])/2$$

The two equations have the same form except that the output frame numbers differ by one.

Anyway, one low-frequency image data SL corresponds to the average value of low-frequency images reflected on two sub-frames SH adjacent to the sub-frame of interest.

As described in association with the prior art, bilaterally asymmetrical distortion occurs in a pursuit image, as shown in FIGS. 9A to 9C or 11A to 11C. The shape of distortion changes between the "forward order" and the "reverse order". More specifically, the shape is reversed in the lateral direction. Especially, tail-blurring distortion reverses its direction.

<Detailed Explanation of Operation of First Embodiment>

In this embodiment, N=2, and the spatial frequency has two bands, a high frequency H and a low frequency L. In the present invention, however, the frame frequency of an input image may be multiplied by N (or divided into N sub-frames), and the input image may be divided into a plurality of spatial frequency bands. In this case, of the plurality of bands, a higher-frequency component is concentrated on the time basis, whereas a lower-frequency component is distributed on the time basis. Additionally, the temporal centers of gravity are arranged to match. Hence, N may be 2 or more so that an input image is divided into a plurality of spatial frequency bands.

To satisfy the above conditions of the spatial high-frequency component H and spatial low-frequency component L, and concentrate H to one sub-frame, the number of sub-frames to distribute must be odd and at least 3. In this embodiment, N=2, and display is done using sub-frames obtained by doubling the frame rate. One input image is distributed to three sub-frames. That is, the number Nd of sub-frames to distribute is 3. In this embodiment, the relationships (N=2, and Nd=3) are simultaneously achieved as frames adjacent to each other in an input image share one of the sub-frames at the ends as the sub-frame to distribute. If N is an even number, the components are distributed to Nd (Nd≧N) that is an odd number, and adjacent frames share, for example, one sub-frame. The coefficient of the sub-frame is obtained by adding the original distribution coefficients. This solves the mismatch between N and Nd. The sum value must not exceed the coefficient of another sub-frame of the same spatial frequency component.

FIG. 28 is a table showing the relative relationship of images. That is, FIG. 28 faithfully expresses the operation in FIG. 1 in accordance with the transition of frames. The transition of frames is shown along the horizontal direction of FIG. 28. The types of images or image components are shown along the vertical direction. Each cell of the first line represents one frame of an input image sequentially from the left. From the second line, each column represents one sub-frame sequentially from the left. An output image is delayed by one frame from an input image A. Hence, in FIG. 28 as well, the value i in the second line is smaller by one than that in the first line.

The first line of FIG. 28 represents the input image A. The second line represents sub-frames to be output. The third to seventh lines show the spatial high-frequency component H and the spatial low-frequency component L which are extracted from each frame of the input image A using a filter and multiplied by coefficients. The eighth line represents the breakdown of the sum output components of the sub-frames in the second line.

Frequency components corresponding to A[i] in the first line of FIG. 28 are shown in the fourth to sixth columns of the fifth line. FIG. 29 shows details of this portion. In this way, each frame of the input image is distributed (multiplied) to three sub-frames using the coefficients shown in FIG. 28. In FIG. 29, GL1 to GL3 are {0.5, 1, 0.5}, and GH1 to GH3 are {0, 2, 0}.

Figure 30:
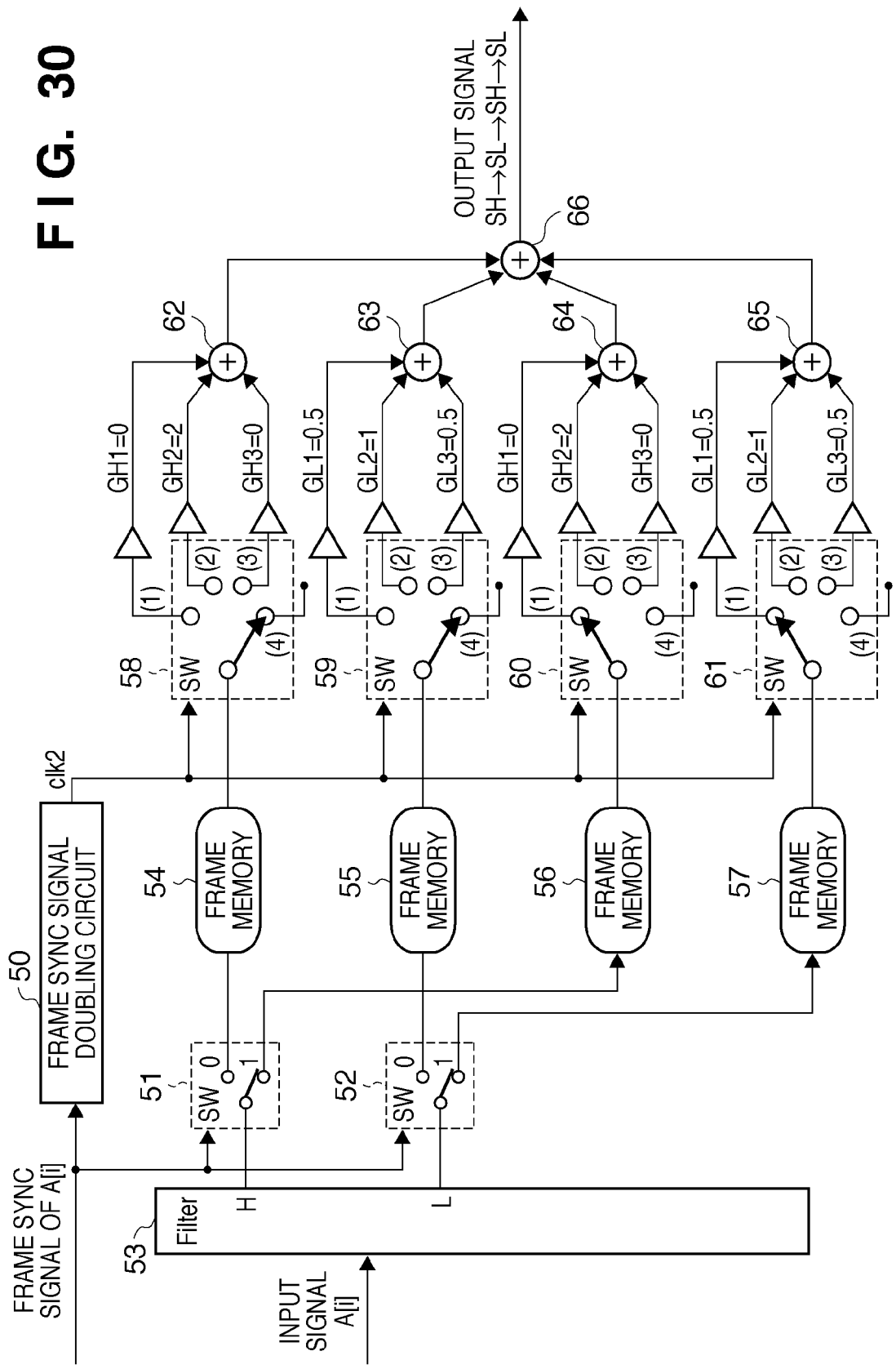
FIG. 30 is a block diagram showing the arrangement of an image processing apparatus according to a modification of the first embodiment.

FIG. 30 shows a modification of the first embodiment. The arrangement in FIG. 30 has the same function as in FIG. 1. FIG. 1 illustrates the embodiment in the simplest form. FIG. 30 shows, for example, how to distribute the input image A to three sub-frames at a predetermined ratio in accordance with FIG. 28. It is also possible to implement an arrangement example different from FIG. 1 by appropriately changing the coefficients of multipliers in FIG. 30, while satisfying a predetermined condition.

The block diagram in FIG. 30 will be described. A doubling circuit 50 doubles an input frame sync signal (e.g., 60 Hz) to generate a sync signal clk2 of 120 Hz. A filter 53 separates the input image into a spatial high-frequency component (H) and a spatial low-frequency component (L) and corresponds to a combination of the LPF 1 and the subtractor 2 in FIG. 1. Each of switches 51 and 52 selects the output terminals in the order of (0)->(1) or (1)->(0) every time the frame sync signal of A[i] is input.

Each of switches 58 to 61 selects its four output terminals in the order of (1)->(2)->(3)->(4)->(1) . . . step by step every time the output clk2 from the doubling circuit 50 is input. The switches 58 and 59 are connected to channels of the same number. The switches 60 and 61 are also connected to channels of the same number. However, the switches 60 and 61 are connected to channels whose number differs by two steps from that of the switches 58 and 59. The output terminals (4) of the switches are dummy connections to generate timings. For the operation shown in FIG. 28, each switch selects the output terminals in the order of (1)->(2)->(3)->(4)->(1)->(2) . . . in accordance with clk2.

A multiplier having a predetermined coefficient is connected to each channel of the switches 58 to 61. Each of adders 62, 63, 64, and 65 adds the outputs from the corresponding switch. An adder 66 adds the outputs from the adders 62 to 65.

The switches 58 and 60 have the same combination of coefficients of multipliers. The switches 59 and 61 also have the same combination of coefficients of multipliers.

The coefficients GH1 to GH3 of the multipliers of the switches 58 and 60 are related to a spatial high-frequency component and indicated by the H component in FIG. 29. The coefficients GL1 to GL3 of the multipliers of the switches 59 and 61 are related to a spatial low-frequency component and indicated by the L component in FIG. 29.

The flow of signals in FIG. 30 will now be described. FIG. 30 shows the arrangement at the timing of the fourth column in FIG. 28 (i.e., a timing corresponding to the sub-frame SL[i−1]). The filter 53 separates the input signal A[i] into the spatial high-frequency component H[i] and the spatial low-frequency component L[i]. The separated spatial high-frequency component H[i] and spatial low-frequency component L[i] are sent to the switches 51 and 52, respectively. The switches select the output terminals (1) to temporarily store the frequency components in frame memories 56 and 57.

The output terminals (0) of the switches 51 and 52 previously output the components from the immediately preceding frames H[i−1] and L[i−1] to frame memories 54 and 55 so that they temporarily store the signals.

The frame memories 54, 55, 56, and 57 receive new data from the filter 53 and update their contents every time the switches 51 and 52 are connected to corresponding terminals. Each stored data item is held for a period corresponding to two frame periods in the input image. Additionally, immediately before connections of the switches 58 to 61 change from the output terminal (4) to the output terminal (1), the contents of the corresponding frame memories are updated.

In this state, the switches 58 to 61 sequentially change the output terminals. These outputs are added to obtain the output of this embodiment. For example, when the switches 58 and 59 change the output terminals in the order of (1)->(2)->(3), it indicates that components corresponding to A[i−1] in FIG. 28 are output, that is, the spatial frequency band components are output in the order of second column->third column->fourth column of the fourth line. Similarly, when the switches 60 and 61 change the output terminals in the order of (1)->(2)->(3), it indicates that components corresponding to A[1] in FIG. 28 are output, that is, the spatial frequency band components are output in the order of fourth column->fifth column->sixth column of the fifth line.

The output signal of this block diagram obtained in the above-described way corresponds to the eighth line (lowermost stage) of FIG. 28. The coefficients shown in FIG. 29 are used as the coefficients GL1 to GL3 and GH1 to GH3 of the multipliers shown in FIG. 30. As long as these coefficients are used, the arrangement in FIG. 30 has the same function as in FIG. 1. To satisfy the feature of the present invention, it is necessary that, for example, the first and third terms are equal in association with GL1 to GL3, the sum of the coefficients is 2, and the double value of the coefficient at each end is less than or equal to that at the center. Hence, GL1 to GL3 can be, for example, {0.4, 1.2, 0.4} or {0.3, 1.4, 0.3}. When GL1 to GL3 in FIG. 30 are replaced with these coefficients, slightly more flicker is generated as compared to the first embodiment, though an embodiment with smaller distortion can be implemented. The latter coefficients tend to provide a larger effect.

As a result, an image having smaller motion blur and smaller flicker can be obtained, as in the first embodiment.

<Cause of Tail-Blurring>

The reason why ghosting or tail-blurring is generated when the temporal center of gravity shifts between L[i] and H[i] will be described below. An example will be explained here in which the frame frequency of the input image is 60 Hz.

Note that tail-blurring is a kind of distortion that draws a trail before or after an edge of an object in pursuit.

Figure 7A:
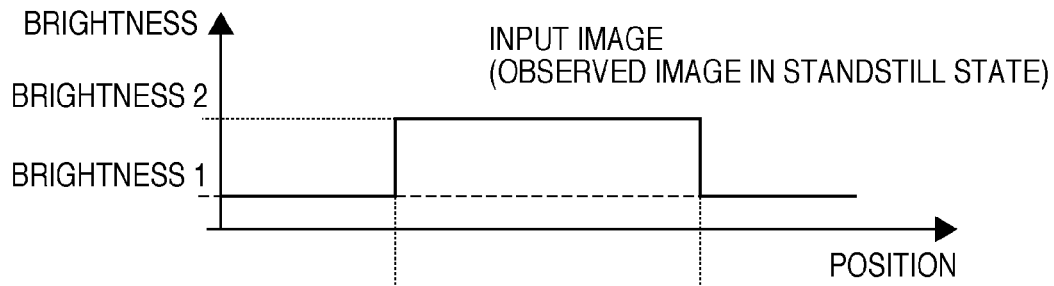
FIGS. 7A to 7D are graphs for explaining the causes of tail-blurring.

Consider pursuing an image which has a brightness scanning line with a rectangular waveform, and which moves V (pixels) per 1/60 sec, as shown in FIG. 7A. That is, the image is a moving image having an object which moves V (pixels) between frames.

Figure 7B:
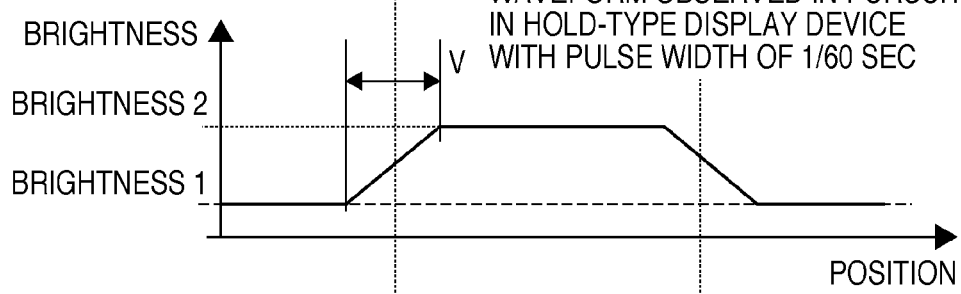

In a hold-type display device having a pulse width of, for example, 1/60 sec (frame frequency: 60 Hz), motion blur with a width of V (pixels) is observed (corresponding to the tilted portions shown in FIG. 7B).

Figure 7C:
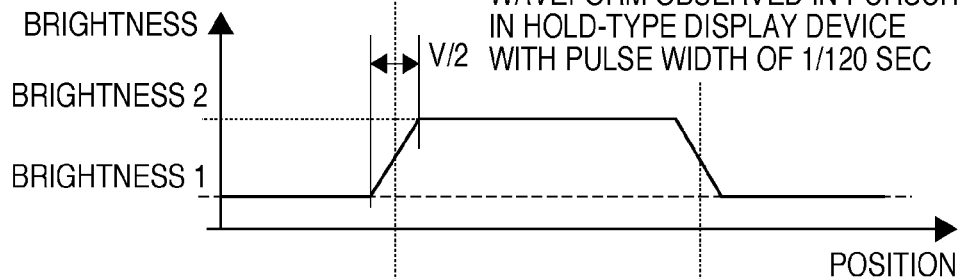

In a hold-type display device having a pulse width of, for example, 1/120 sec (frame frequency: 120 Hz), motion blur with a width of V/2 (pixels) is observed (corresponding to the tilted portions shown in FIG. 7C).

Figure 7D:
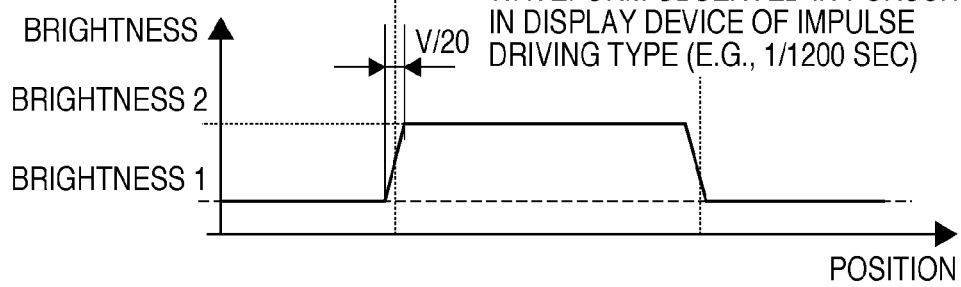

In impulse driving, the pulse width is small. Hence, a pursuit image relatively close to the waveform of a still image is obtained. FIG. 7D shows a case in which the pulse width is 1/1200 sec. In any case, motion blur represented by the width of a tilted portion has a value almost equal to the pulse width. The frame frequency is not directly related to this value. In a hold-type display device, the pulse width equals or almost equals "1/frame frequency".

Figure 8A:
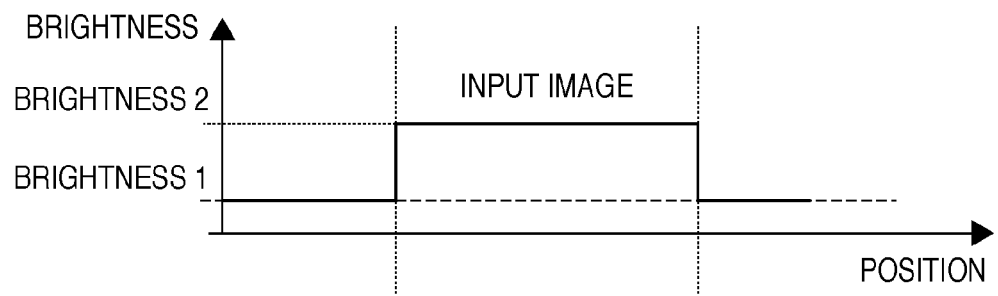
FIGS. 8A to 8C are graphs for explaining why motion blur does not occur in an image without a change over time.
Figure 8B:
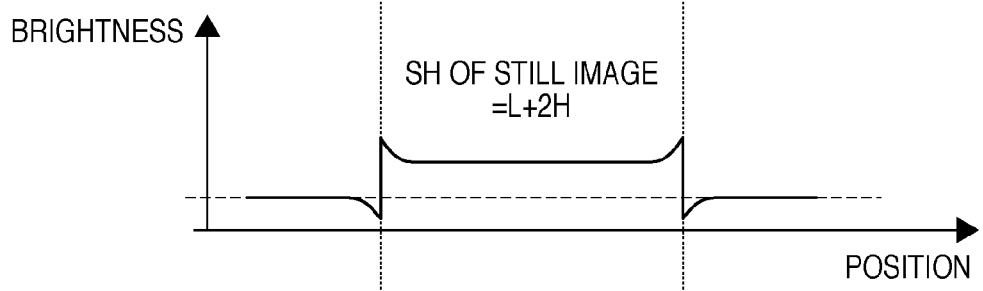
Figure 8C:
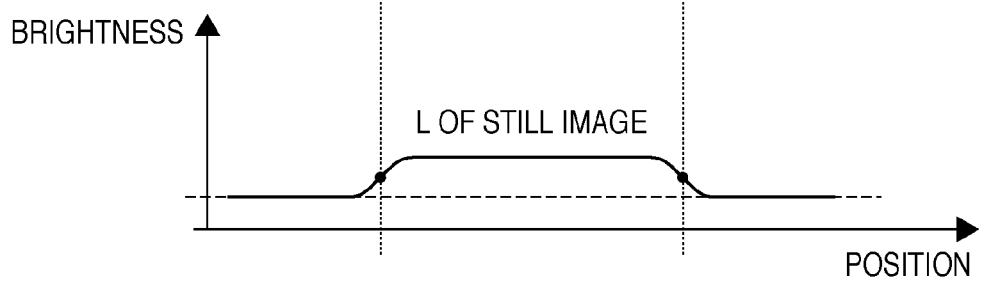

FIGS. 8A to 8C show waveforms obtained by separating the input image A into a spatial high-frequency component and a spatial low-frequency component using an HPF or LPF. FIG. 8A shows the waveform of the input image A. SH (=L+2H) and SL (=L) have waveforms shown in FIGS. 8B and 8C. However, FIGS. 8A to 8C show not the waveforms of an image observed in pursuit but those of a still image. Hence, there is no influence of motion blur.

Figure 9A:
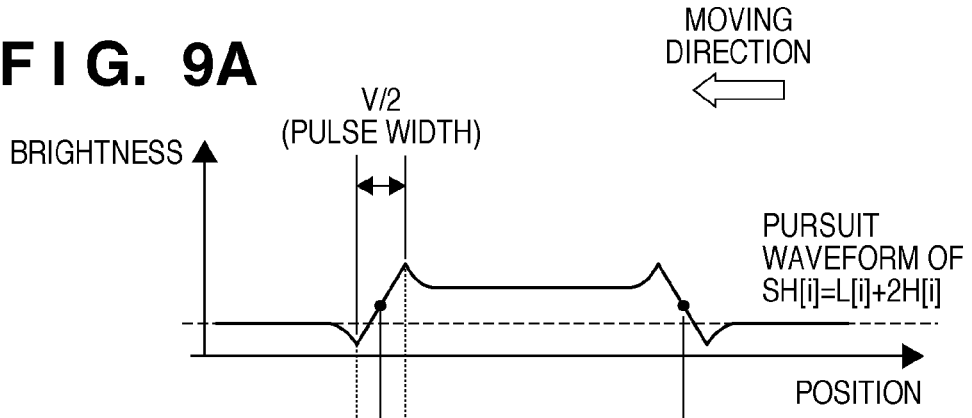
FIGS. 9A to 9C are graphs showing image signals SH and SL assuming that pursuit is done for the images shown in FIGS. 8A to 8C.
Figure 9B:
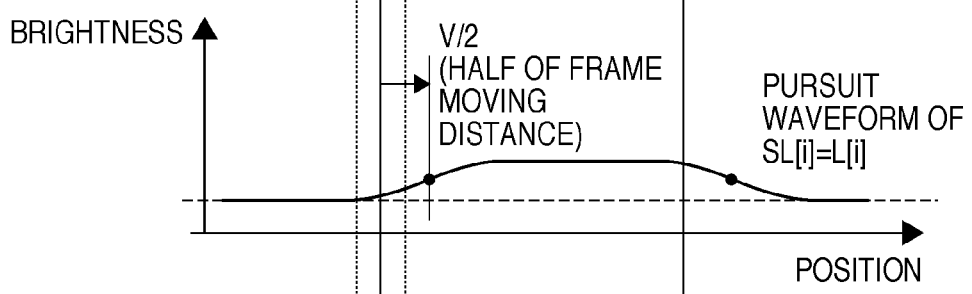
Figure 9C:
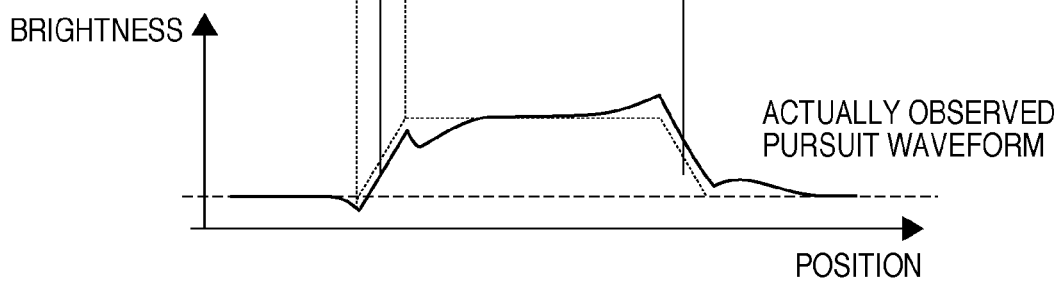

FIGS. 9A to 9C are views assuming pursuit of SH[i] and SL[i] in FIGS. 8B and 8C.

Since the display period is 1/120 sec, the waveform exhibits motion blur corresponding to the pulse width of 1/120 sec shown in FIG. 7C. In prior art systems, since SH[i] is generated from the same frame as that of SL[i], they are frames of the same time. In pursuit, SL[i] is formed with a shift with respect to SH[i] in a direction reverse to the moving direction of the image by ½ (i.e., V/2) of the moving distance in a frame period.

Actually, SH[i] and SL[i] in FIGS. 9A and 9B are alternately displayed every 1/120 sec. Hence, the actual human vision recognizes the composite waveform in FIG. 9C. This waveform has tail-blurring as compared to that in FIG. 7C. The first embodiment reduces this distortion.

Figure 10A:
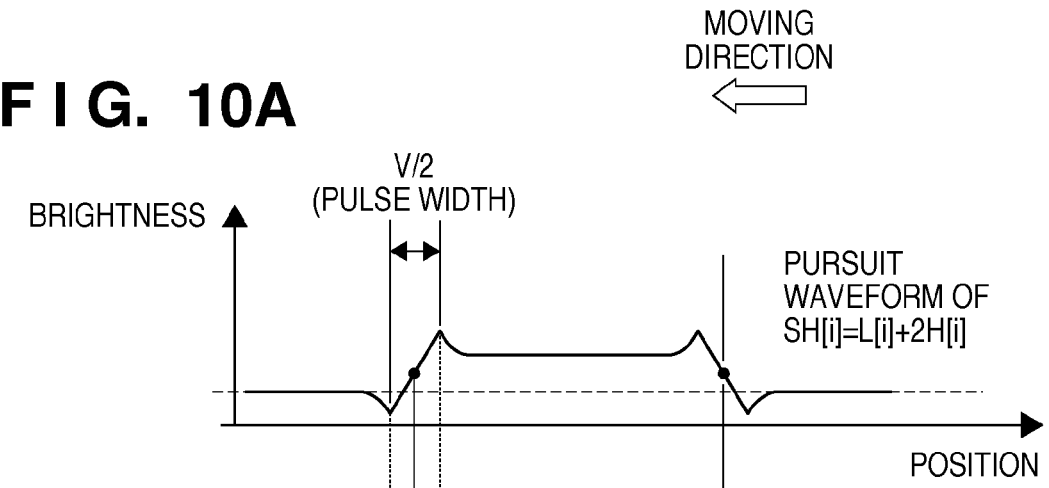
FIGS. 10A to 10C are graphs showing image signals SH and SL assuming that pursuit is done in the first embodiment.
Figure 10B:
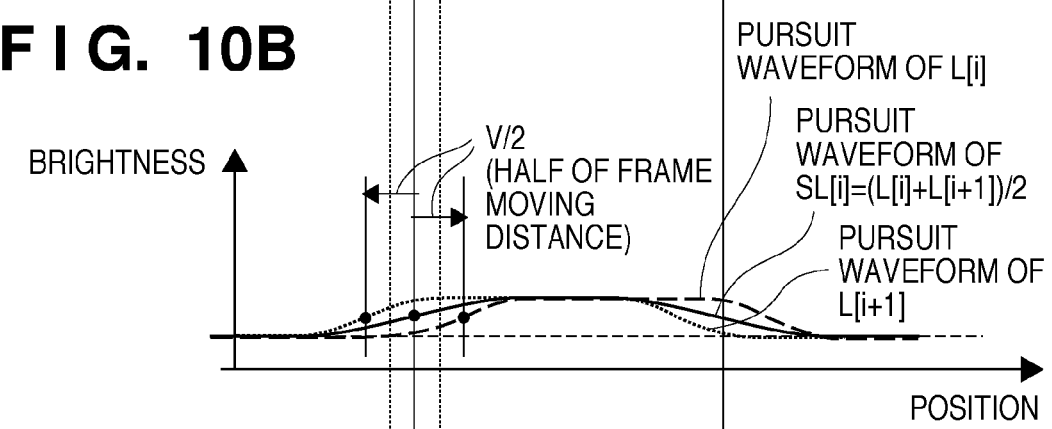
Figure 10C:
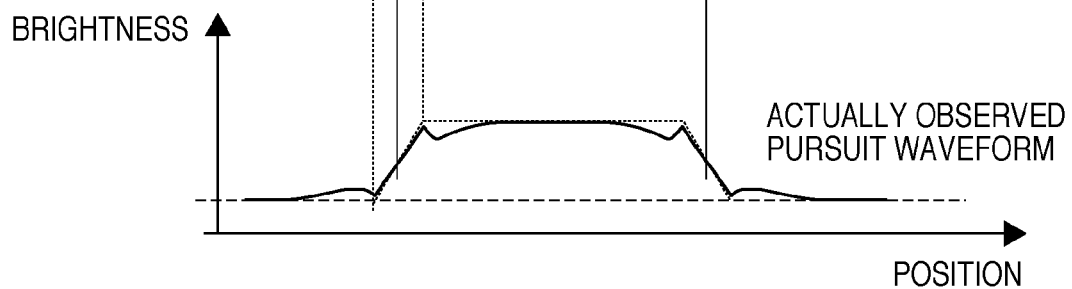

In this embodiment, for example, SL[i] which is displayed between SH[i] and SH[i+1] is formed from the average value of spatial low-frequency components corresponding to them, that is, {L[i]+L[i+1]}/2, as shown in FIG. 3. FIGS. 10A to 10C show SH[i] (=L[i]+2×H[i]), SL[i] (={L[i]+L[i+1]}/2), and the waveform of a pursuit image, as in FIGS. 9A to 9C.

As described above, in pursuit, L[i] is generated from the same frame of the input image as that of SH[i] which is displayed 1/120 sec earlier, and therefore formed with a shift in the direction opposite the moving direction of the image by ½ (V/2) of the moving distance per frame. On the other hand, L[i+1] is generated from the same frame of the input image as that of SH[i+1] which is displayed 1/120 sec later, and therefore formed with a shift in the direction opposite the moving direction of the image by ½ (V/2) of the moving distance per frame. Hence, the waveform SL[i] (={L[i]+L[i+1]}/2) obtained by adding them and dividing the sum by 2 is located almost the same position as SH[i] in terms of temporal center of gravity, as shown in FIG. 10B.

Actually, SH[i] and SL[i] in FIGS. 10A and 10B are alternately displayed every 1/120 sec. Hence, the actual human vision recognizes the composite waveform (FIG. 10C). This waveform is bilaterally symmetrical and has no tail-blurring as compared to that in FIG. 9C. Reducing the tail-blurring distortion is an effect of this embodiment.

An example has been described above in which a hold-type display device, whose pulse width equals the frame period, displays an input image with a frame frequency of 60 Hz at a double rate. Even in an impulse-type display device, the problems of the prior art and the effect of the embodiment are the same.

Assume that an impulse-type display device has a pulse width of 1/10 of the frame period, that is, the input image has a pulse width of 1/600 sec (1.67 msec) and a frame frequency of 60 Hz. Consider a case in which when the frame rate is doubled, the pulse width is ½ of it (1/1200 sec (=0.83 msec)).

Figure 11A:
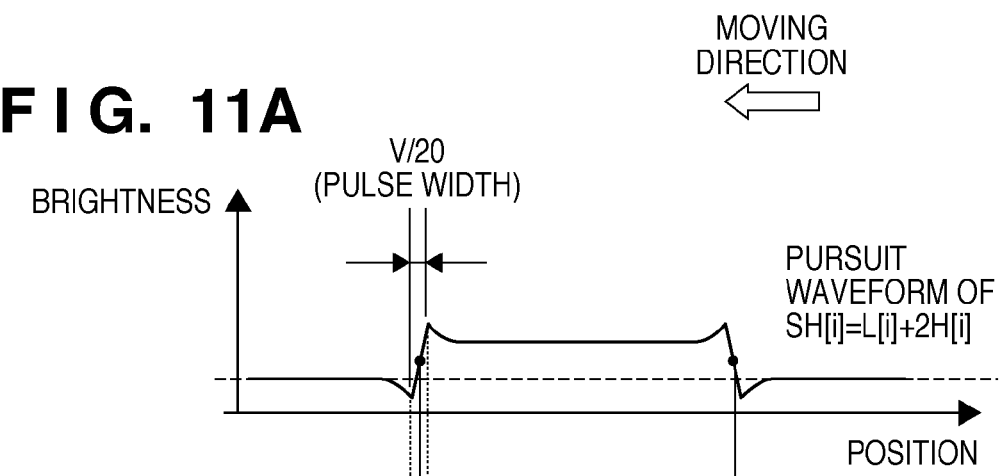
FIGS. 11A to 11C are graphs showing pursuit waveforms of a prior art arrangement.
Figure 11B:
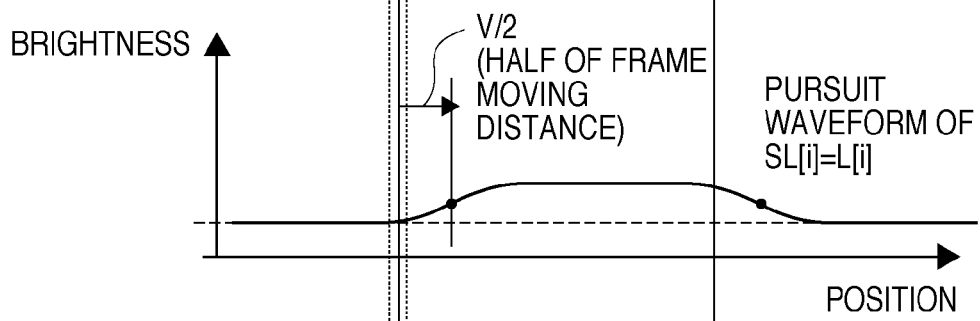
Figure 11C:
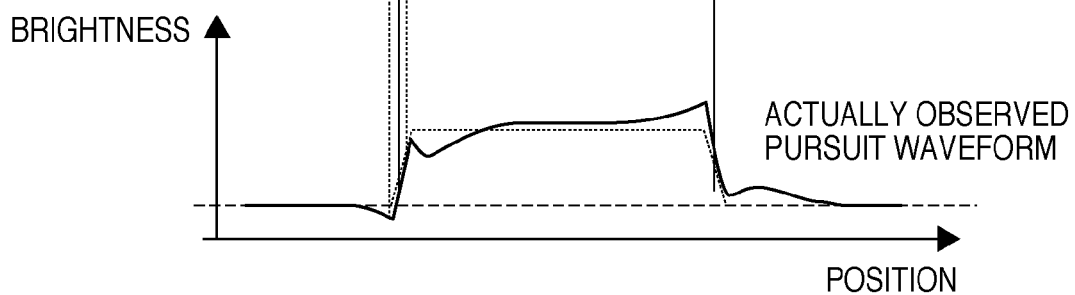
Figure 12A:
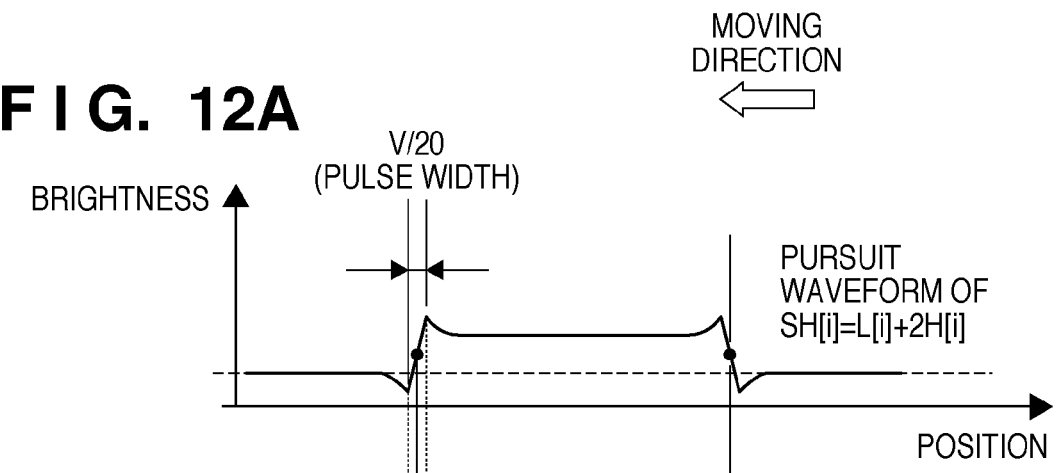
FIGS. 12A to 12C are graphs showing pursuit waveforms according to the first embodiment.
Figure 12B:
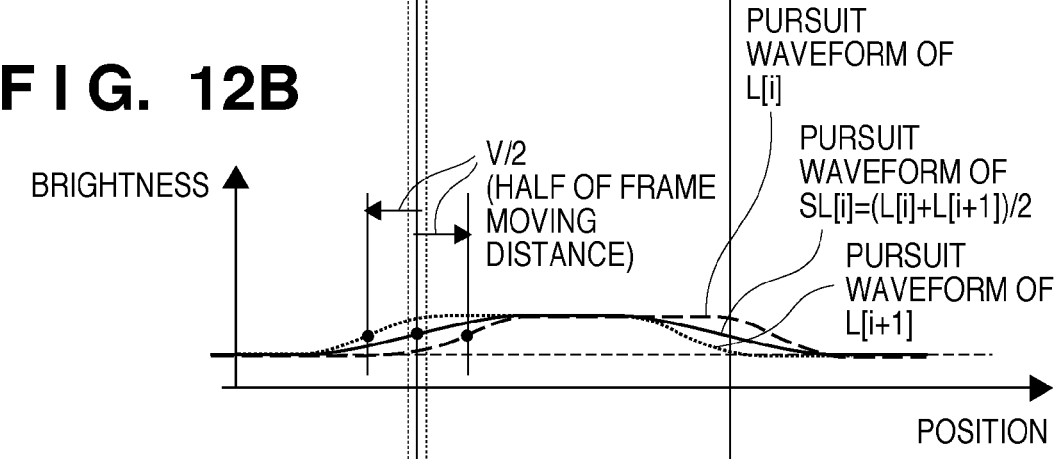
Figure 12C:
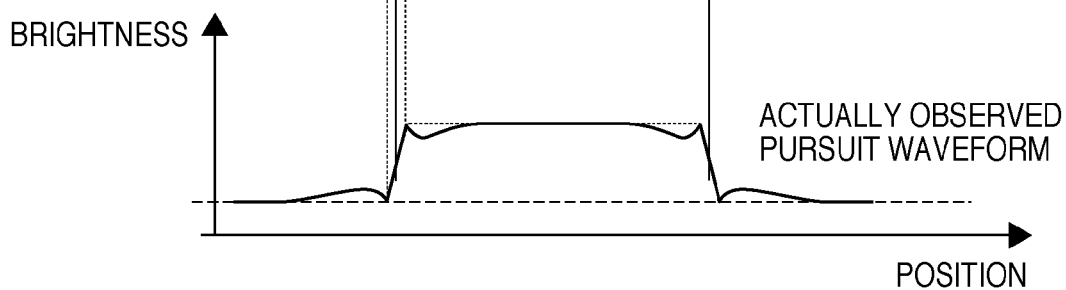

In this case, the pursuit image of the prior art has waveforms as shown in FIGS. 11A to 11C, and the pursuit image of this embodiment has waveforms as shown in FIGS. 12A to 12C. FIGS. 11A to 11C correspond to FIGS. 9A to 9C. FIGS. 12A to 12C correspond to FIGS. 10A to 10C.

V/2 in FIGS. 9A and 10A is equivalent to a distance corresponding to the pulse width that is the cause of motion blur and is therefore replaced with V/20 in FIGS. 11A and 12A. V/2 in FIGS. 9B and 10B is equivalent to a distance corresponding to the time difference between frames and therefore remains V/2 even in FIGS. 11B and 12B.

<Modification of First Embodiment>

An example will be described in which a process equivalent to the first embodiment is implemented by a computer program. An apparatus for executing the computer program can be an information processing apparatus such as a personal computer (PC). The structure and features of the hardware comprising a PC are well known, so will not be described here. We assume that a moving image data file containing m frames per unit time is already stored in a storage device (or storage medium) such as a hard disk. An example will be described in which the CPU executing the application (computer program) of this modification converts the file into moving image data to be played back at twice the frame rate, that is, 2 m frames per unit time, and saves the conversion result in the hard disk as a file. The conversion target moving image data is stored in the storage device. The moving image data after double-rate conversion is also stored in the storage device. Hence, the application need not display the double-rate conversion result. That is, note that the CPU need not execute the process in synchronism with the frame rate of the moving image represented by the conversion target moving image data, either. The application of the modification is also stored in the hard disk. The CPU loads the application to the RAM and executes it.

Figure 27:
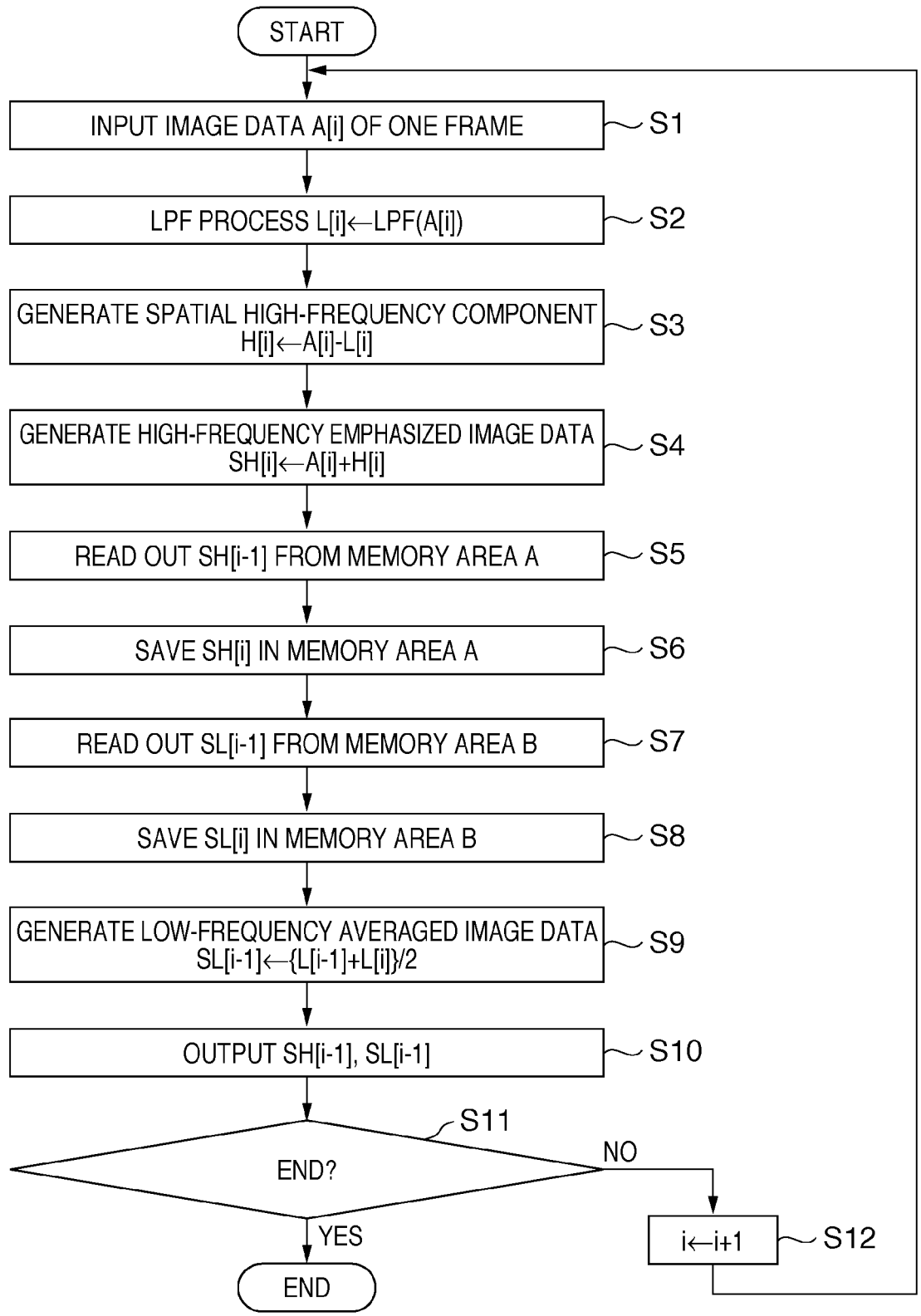
FIG. 27 is a flowchart illustrating the process procedure according to a modification of the first embodiment.

FIG. 27 is a flowchart illustrating the process procedure of the application. The execution process procedure of the CPU will be described below with reference to FIG. 27. In the following explanation, memory areas A and B are areas allocated in the RAM.

In step S1, the CPU reads out image data A[i] of one frame from the conversion target moving image data to the RAM. If the data is encoded, the CPU executes a corresponding decoding process.

In step S2, the CPU filters the input image data frame of interest A[i] using a preset LPF to generate spatial low-frequency component data L[i].

The process advances to step S3. The CPU generates spatial high-frequency component data H[i].

$$H[i]=A[i]-L[i]$$

In step S4, the CPU generates high-frequency emphasized image data SH[i] and temporarily stores it in the RAM.

$$SH[i]=A[i]+H[i]=L[i]+2\times H[i]$$

In step S5, the CPU reads out an immediately preceding frame SH[i−1] from the memory area A as a current frame.

In step S6, the CPU saves SH[i] in the memory area A to prepare for the process of the next input frame.

In step S7, the CPU reads out an immediately preceding frame SL[i−1] from the memory area B as a current frame.

In step S8, the CPU saves SL[i] in the memory area B to prepare for the process of the next input frame.

In step S9, the CPU generates low-frequency averaged image data SL[i−1].

$$SL[i-1]=\{L[i-1]+L[i]\}/2$$

After generating the high-frequency emphasized image data SH and low-frequency averaged image data SL, the CPU advances the process to step S10. In step S10, the CPU outputs the two generated image data (sub-frames) as output moving image data.

SH[i−1] used in step S5 uses the process result in step S6 of the preceding cycle. SL[i−1] used in step S7 uses the process result in step S8 of the preceding cycle. In double-rate conversion of the first frame of the image data, no low-frequency image data of a preceding frame exists. In this case, the process is executed assuming an appropriate pixel value.

In step S11, the CPU determines whether all frames of the conversion target moving image data are converted. This process can be done by determining whether the file end of the conversion target moving image data is detected.

If NO in step S11, the variable i is incremented by "1", and the process from step S1 is repeated.

If YES in step S11, the CPU finishes the series of double-rate conversion processes.

As described above, as compared with the first embodiment, the conversion process speed depends on the CPU. It is however possible to create a double-rate moving image data file having the same function and effect as in the first embodiment.

<Second Embodiment>

Figure 17:
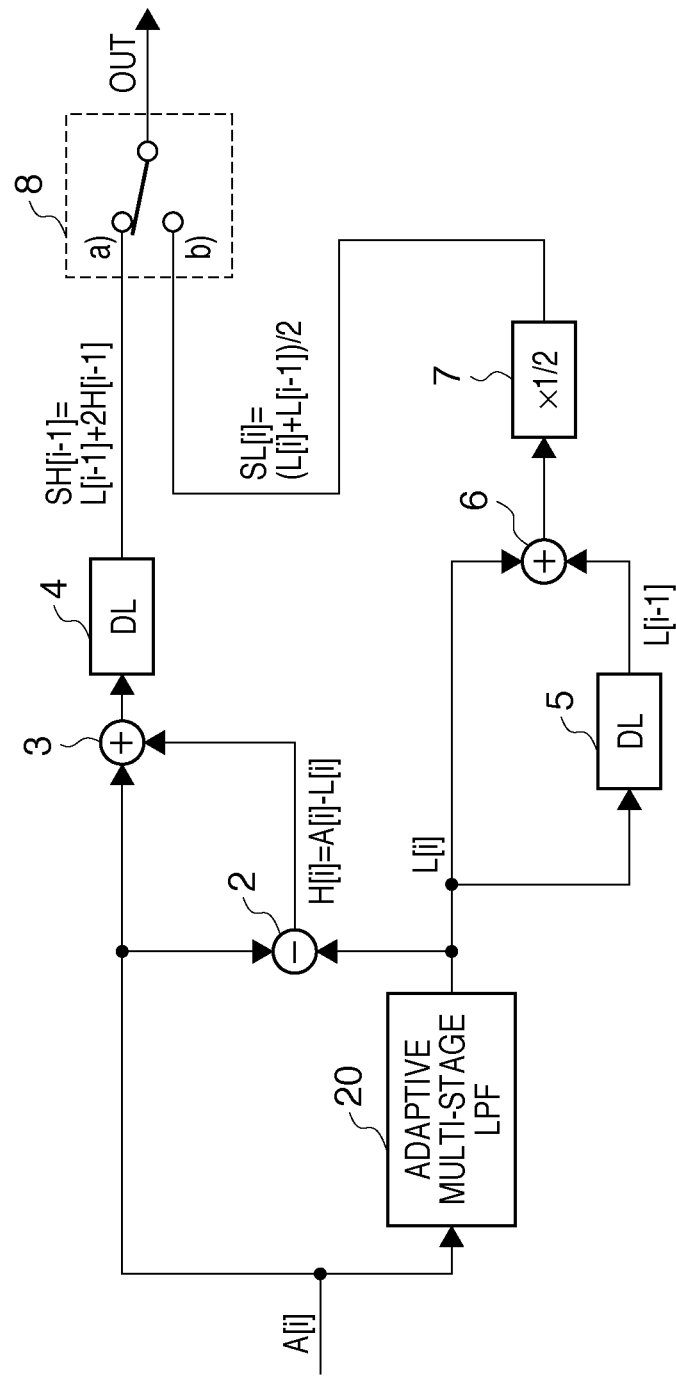
FIG. 17 is a block diagram showing an arrangement of an image processing apparatus according to the second embodiment.

In the second embodiment, an example of a solution to the above-described second problem will be described. FIG. 17 is a block diagram showing an arrangement of an image processing apparatus according to the second embodiment. The same reference numerals as in FIG. 1 denote the same components in FIG. 17, and a description thereof will be omitted.

The second problem occurs when each frame of an input image is filtered to separate a spatial high-frequency component related to motion blur and a spatial low-frequency component related to flicker. That is, in a method of displaying an image by concentrating the spatial high-frequency component to one sub-frame and distributing the spatial low-frequency component to both sub-frames, it is impossible to make full use of the dynamic range of the display device.

"One sub-frame" indicates one of two double-rate frames corresponding to the input image frame. "Both sub-frames" indicates both of the two double-rate frames corresponding to the input image frame.

Figure 13:
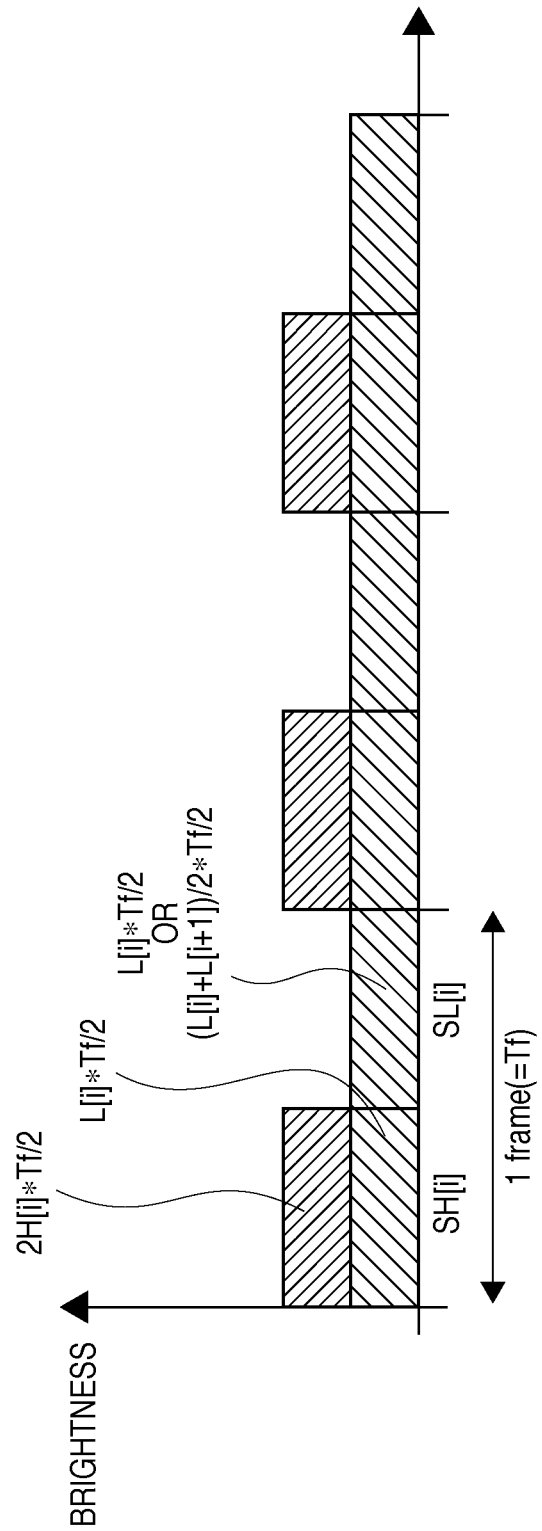
FIG. 13 is a timing chart showing the transition of brightness of sub-frames SH and SL in a hold-type display device according to the second embodiment.
Figure 14:
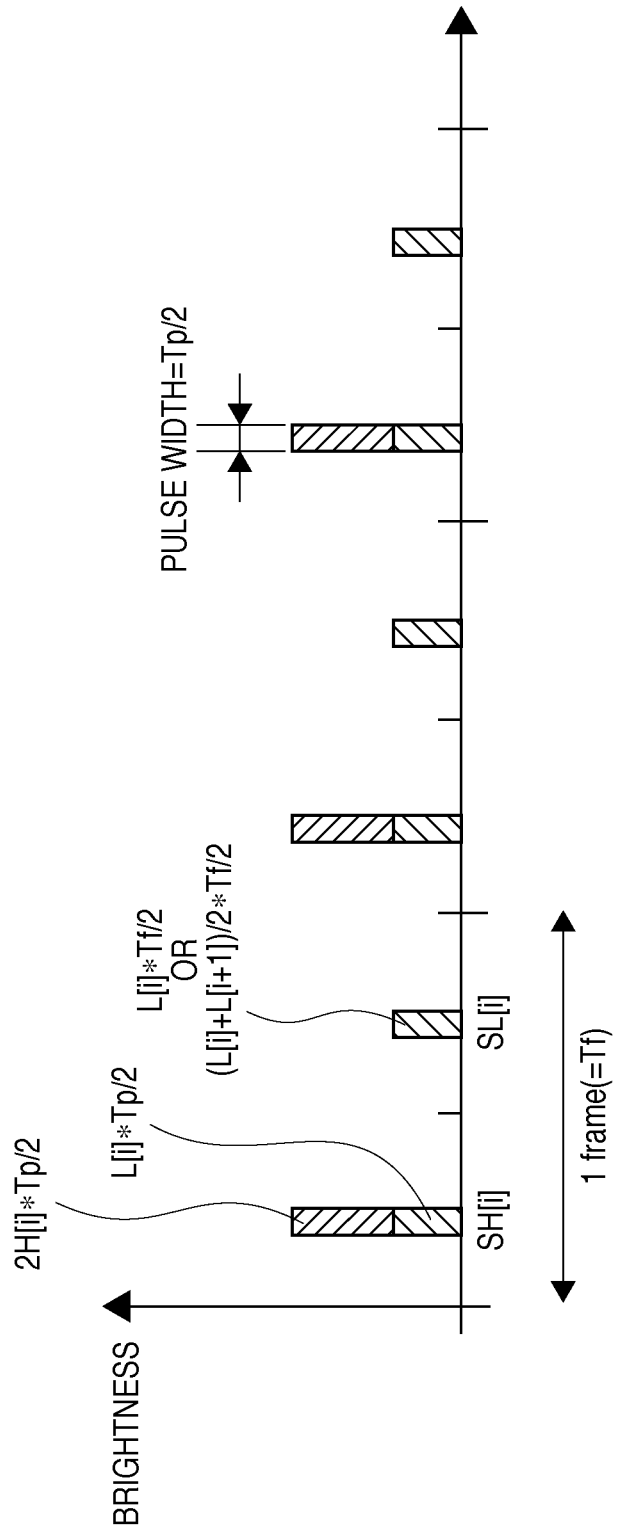
FIG. 14 is a timing chart showing the transition of brightness of sub-frames SH and SL in an impulse-type display device according to the second embodiment.
Figure 15:
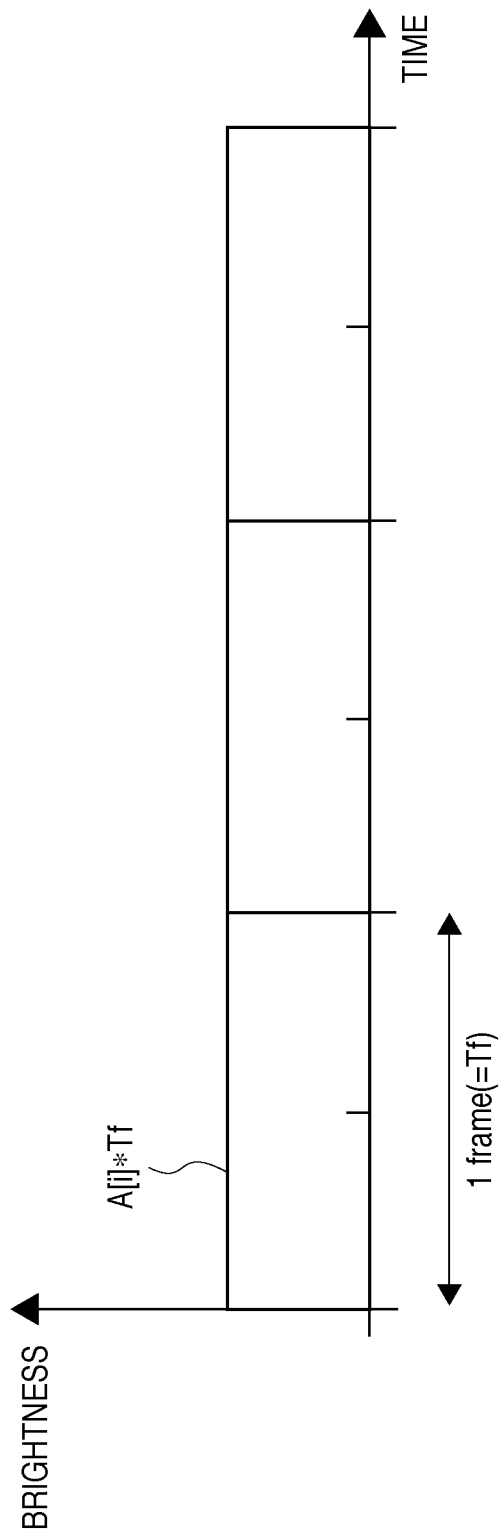
FIG. 15 is a timing chart showing the frame display timing of a conventional hold-type display device.
Figure 16:
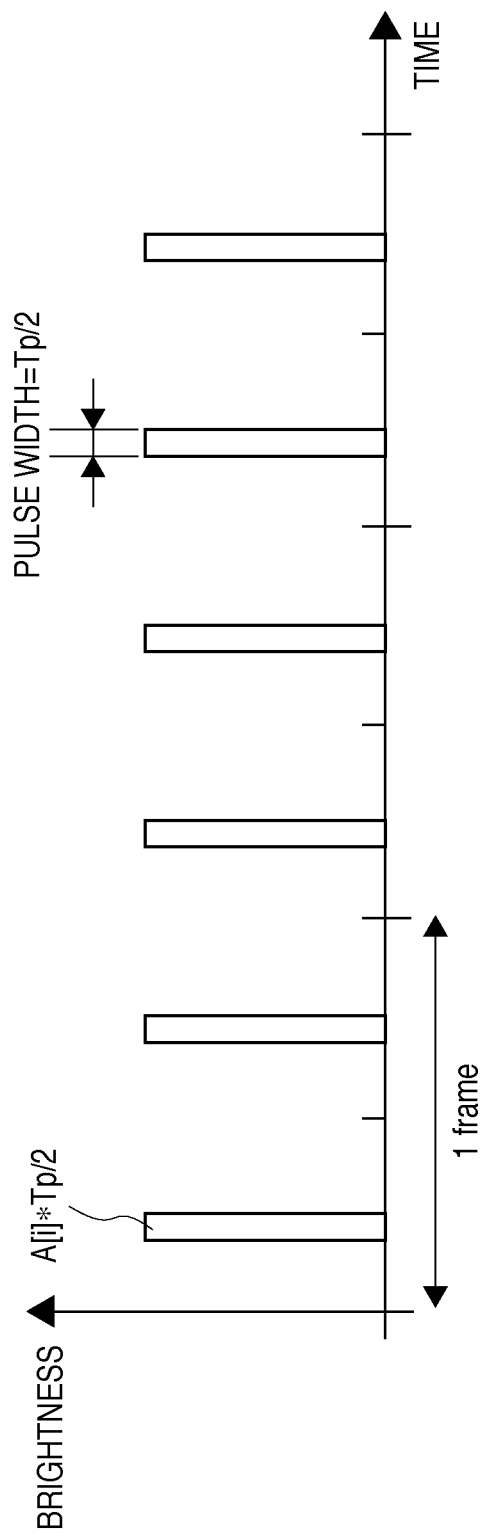
FIG. 16 is a timing chart showing the frame display timing of a conventional impulse-type display device.

In such a display method, the spatial high-frequency component is concentrated to one sub-frame, as in a hold type shown in FIG. 13 or an impulse type shown in FIG. 14. Hence, if, for example, an image with high brightness is displayed, saturation occurs first in a sub-frame that displays SH[i], and a sub-frame that displays SL[i] does not yet reach saturation even after the above-described sub-frame is saturated. For this reason, the maximum display brightness becomes smaller than that of a normal display method (FIGS. 15 and 16). To actually avoid saturation, the original image signal must be multiplied by a ratio smaller than 1. This ratio will be defined as k ($0.5 \leq k \leq 1$) hereinafter. In the first embodiment, an example in which saturation is not taken into consideration has been described. This example can also be regarded as a case using k=1.

To prevent any decrease in brightness, k needs to be as close to "1" as possible. To allow this, it is necessary to minimize the absolute value of the spatial high-frequency component portions in FIG. 13 or 14 as much as possible to reduce the non-uniformity of brightness. The spatial high-frequency component portions in FIG. 13 or 14 can take either a positive value or a negative value. For the sake of simplicity, FIGS. 13 and 14 show a case in which the value is positive.

For this purpose, a distance constant value d of the LPF or HPF is minimized. More specifically, the spatial frequency to separate the spatial low-frequency component and the spatial high-frequency component needs to be set high. In other words, the distance constant value of the filter must be made small to decrease the absolute value of the high-frequency component.

If the distance constant value d is too small, an overshoot portion shown in FIG. 9C or 10C becomes notable. When the distance constant value d is sufficiently large, the waveform in FIG. 10C resembles that in FIG. 7C. The overshoot becomes notable as the pursuit target image moves faster. That is, the minimum and necessary value d for reproducing a waveform needs to be determined based on the speed of the input image as the pursuit target.

In the second embodiment, a large distance constant value d is set for a portion that moves fast in an input image. A small distance constant value d is set for a portion that moves slowly. That is, in the second embodiment, the distance constant value d is determined adaptively for each area of an image in consideration of the spatial frequency distribution of the input image and the moving speed of each portion.

Figure 19:
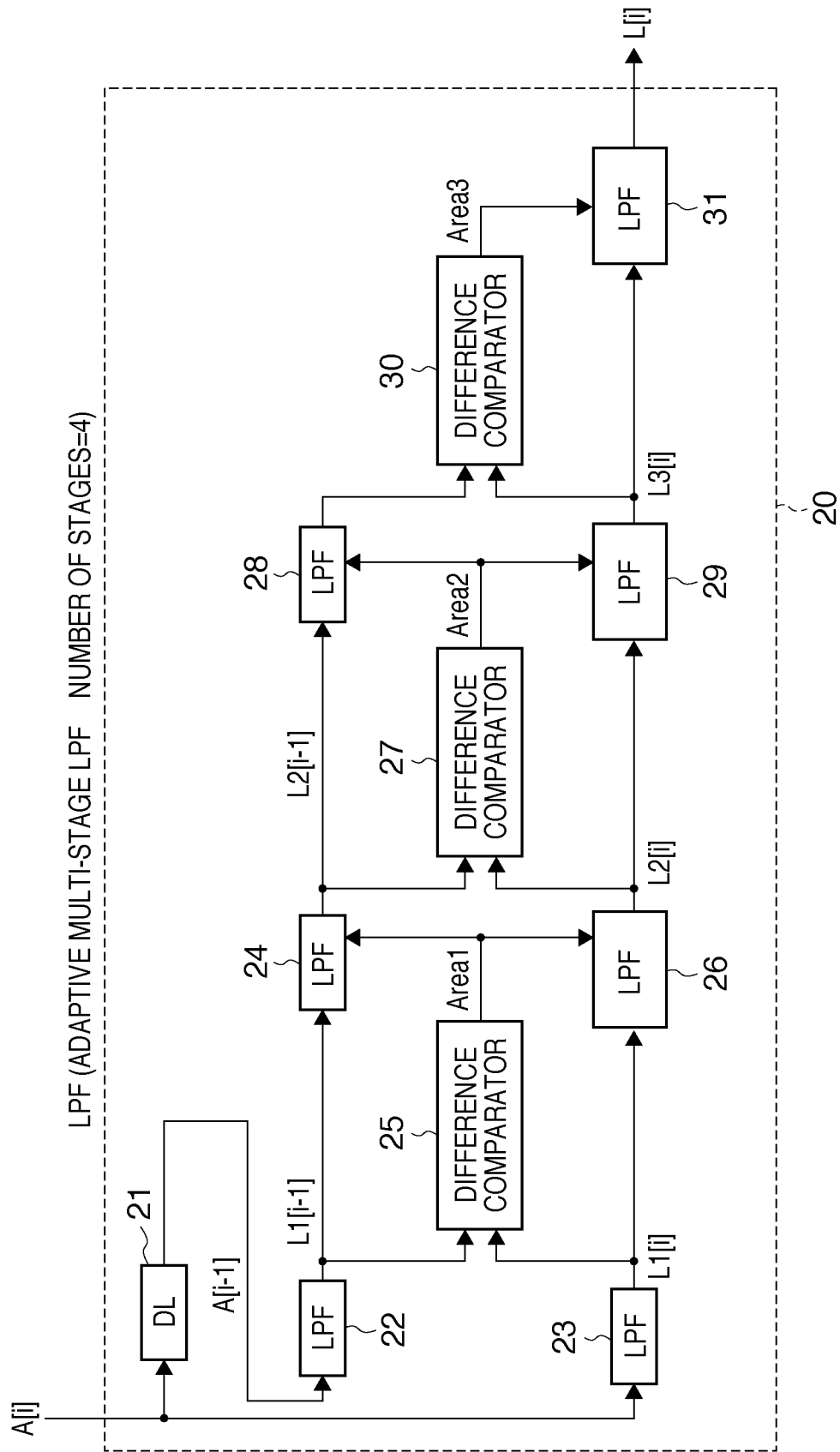
FIG. 19 is a block diagram of an adaptive multi-stage (4-stage) LPF according to the second embodiment.

As shown in FIG. 17, an adaptive multi-stage low-pass filter 20 is used in the second embodiment. FIG. 19 shows the detailed arrangement of the adaptive multi-stage low-pass filter, which includes a plurality of LPFs having a stage structure.

FIG. 19 shows an example in which the number of stages=4, that is, four low-pass filters which execute the filter process of a current frame. As shown in FIG. 19, four LPFs 23, 26, 29, and 31 are connected in a daisy chain. The plurality of LPFs 23, 26, 29, and 31 function as a first filter unit. Similarly, for a preceding frame as well, three LPFs 22, 24, and 28 are connected in a daisy chain. The plurality of LPFs 22, 24, and 28 function as a section filter unit. The LPFs 22 and 23 use the same distance constant value. The LPFs 24 and 26 are also set to use the same distance constant value. The LPFs 28 and 29 also use the same distance constant value. The distance constant value of each low-pass filter LPFn (n=1, 2, 3, 4) is set to be dn (n=1, 2, 3, 4) in accordance with the numerical subscript. The larger the numerical subscript is, the larger the set distance constant value is. That is, the upper-limit spatial frequency of the frequency range to be passed becomes lower in ascending order of numerical subscript, that is, as the filter position goes downstream. Hence, the distance constant value can also be regarded as information that specifies the upper-limit spatial frequency for filtering.

The functions of blocks in FIG. 19 will now be described.

A delay circuit (DL) 21 delays input image data by one frame and outputs it. In fact, the DL 21 can be formed from a FIFO memory for storing one frame of image data. When the current frame of image data input to the adaptive multi-stage low-pass filter 20 is A[i], the DL 21 outputs the preceding frame A[i−1] of the image data.

The LPFs 22 and 23 filter the input image data in accordance with a distance constant value d1.

The LPFs 24 and 26 receive, as input data, signals L1[i−1] and L1[i] from the upstream LPFs 22 and 23 and area data AREA1 output from a difference comparator 25. A distance constant value d2 is preset for the LPFs 24 and 26. The LPFs 24 and 26 respectively filter L1[i−1] and L1[i] corresponding to the pixels in the area represented by the area data AREA1 in accordance with the distance constant value d2. Although the filtering process is done in that area, the range where the image data is changed by this process is wider than the area by the distance constant value d2. The filtering results are output as L2[i−1] and L2[i].

The LPFs 28 and 29 receive, as input data, the signals L2[i−1] and L2[i] from the LPFs 24 and 26 and area data AREA2 output from a difference comparator 27. A distance constant value d3 is preset for the LPFs 28 and 29. The LPFs 28 and 29 respectively filter L2[i−1] and L2[i] corresponding to the pixels in the area represented by the area data AREA2 in accordance with the distance constant value d3. Although the filtering process is done in that area, the range where the image data is changed by this process is wider than the area by the distance constant value d3. The filtering results are output as L3[i−1] and L3[i].

The LPF 31 receives, as input data, the signal L3[i] from the LPF 29 and area data AREA3 output from a difference comparator 30. A distance constant value d4 is preset for the LPF 31. The LPF 31 filters L3[i] corresponding to the pixels in the area represented by the area data AREA3 in accordance with the distance constant value d4. Although the filtering process is done in that area, the range where the image data is changed by this process is wider than the area by the distance constant value d4. The filtering result is output as a final result L[i] of the adaptive multi-stage low-pass filter 20.

The difference comparator 25 receives L1[i−1] and L1[i], calculates the absolute value of the difference for each pixel, and based on the result, calculates the area data AREA1. A constant value C1 for determination is preset for the difference comparator 25. AREA1 is array data with the same form as L1. Data corresponding to a pixel whose absolute value of the difference is larger than or equal to C1 is defined as "1". Data corresponding to a pixel whose absolute value of the difference is smaller than C1 is defined as "0".

More specifically, for each pixel (x,y),
when $|L1[i](x,y) - L1[i-1](x,y)| \geq C1$,
AREA1(x,y) = "1" and
when $|L1[i](x,y) - L1[i-1](x,y)| < C1$,
AREA1(x,y) = "0"

The area data AREA1 defined in this way is output by the difference comparator 25.

The difference comparator 27 receives L2[i−1] and L2[i], calculates the absolute value of the difference for each pixel, and based on the result, calculates the area data AREA2. A constant value C2 for determination is preset for the difference comparator 27. AREA2 is array data with the same form as L2. Data corresponding to a pixel whose absolute value of the difference is larger than C2 is defined as "1". Data corresponding to a pixel whose absolute value of the difference is smaller than C2 is defined as "0".

> More specifically, for each pixel (x,y),
> when $|L2[i](x,y) - L2[i-1](x,y)| \geq C2$,
> AREA2(x,y) = "1" and
> when $|L2[i](x,y) - L2[i-1](x,y)| < C2$,
> AREA2(x,y) = "0"

The area data AREA2 defined in this way is output by the difference comparator 27.

The difference comparator 30 receives L3[i−1] and L3[i], calculates the absolute value of the difference for each pixel, and based on the result, calculates the area data AREA3. A constant value C3 for determination is preset for the difference comparator 30. AREA3 is array data with the same form as L3. Data corresponding to a pixel whose absolute value of the difference is larger than C3 is defined as "1". Data corresponding to a pixel whose absolute value of the difference is smaller than C3 is defined as "0".

> More specifically, for each pixel (x,y),
> when $|L3[i](x,y) - L3[i-1](x,y)| \geq C3$,
> AREA3(x,y) = "1" and
> when $|L3[i](x,y) - L3[i-1](x,y)| < C3$,
> AREA3(x,y) = "0"

The area data AREA3 defined in this way is output by the difference comparator 30.

Considering the above explanation, the operation of the adaptive multi-stage LPF 20 of the second embodiment shown in FIG. 19 will be described below.

The outline will briefly be described first.

The LPF 23 always performs the filtering process in all areas of every frame. If there is an area where the filtering result by the LPF 23 is insufficient, the LPF 26 executes the filtering process. If there is still an area where filtering is insufficient, the filtering process is performed by the LPF 29 and then by the LPF 31.

It is determined in the following way whether filtering by an LPF is sufficient in each area.

The LPFs 22, 24, and 28 filter the preceding frame A[i−1] of the image data. The difference between the filtering result of the current frame A[i] of the image data and the filtering result of the preceding frame is compared with a threshold. An area where the difference is larger than the threshold is determined as an area where filtering by the LPF is insufficient. In contrast, an area where the difference is less than or equal to the threshold is determined as an area where filtering by the LPF is sufficient. Information representing the area determined to have an insufficient difference is sent to the LPF of the next stage. The LPF of the next stage executes the filtering process in that area. The adaptive multi-stage LPF 20 of this embodiment is a 4-stage LPF. Hence, even if the filtering result is finally insufficient, the filtering result by the LPF 31 is output as the image data L[i] that is the output of the adaptive multi-stage LPF 20.

The filtering process of this embodiment will be described below in accordance with the sequence.

First, the input image A[i] and the immediately preceding frame A[i−1] of the image data pass through the LPFs 22 and 23, respectively. That is, $$L1[i]=LPF1(A[i])$$

$$L1[i-1]=LPF1(A[i-1])$$

Actually, L1[i−1] is already calculated in the output process of the immediately preceding frame. Hence, the calculated data may be saved and loaded from the memory.

The difference comparator 25 calculates the absolute value of the difference between L1[i−1] and L1[i], compares the absolute value with a threshold constant value C for each pixel (x,y) to create the area data AREA1, and sends it to the LPFs 24 and 26.

The LPFs 24 and 26 execute the filtering process LPF2 of the data L1[i−1] and L1[i] sent from the upstream in the area represented by AREA1. This process can be represented by, for example, $$L2=L1-(AREA1*L1)+LPF2((AREA1*L1))$$

(AREA1*L1) means an operation of outputting image data in which pixel data whose component in AREA1 is "1" is the same as the data in the image data L1, and pixel data whose component in AREA1 is "0" remains "0". The thus obtained L2[i] and L2[i−1] are sent to the LPFs 28 and 29.

The LPFs 28 and 29 execute the filtering process LPF3 of the data L2[i−1] and L2[i] sent from the upstream in the area represented by AREA2. This process can be represented by, for example, $$L3=L2-(AREA2*L2)+LPF3((AREA2*L2))$$

(AREA2*L2) means an operation of outputting image data in which pixel data whose component in AREA2 is "1" is the same as the data in the image data L2, and pixel data whose component in AREA2 is "0" remains "0". The thus obtained L3[i] is sent to the LPF 31.

The LPF 31 executes the filtering process LPF4 of the sent data L3[i] in the area represented by AREA3. This process can be represented by, for example, $$L4=L3-(AREA3*L3)+LPF4((AREA3*L3))$$

(AREA3*L3) means an operation of generating image data in which pixel data whose component in AREA3 is "1" is the same as the data in the image data L3, and pixel data whose component in AREA3 is "0" remains "0".

The thus obtained L[i] is output as image data that is the output of the adaptive multi-stage LPF 20.

The adaptive multi-stage LPF 20 according to the second embodiment includes the first filter unit (LPFs 23, 26, 29, and 31) and the second filter unit (LPFs 22, 24, and 28). Sequentially from the upstream stage, the absolute value of the difference between image data obtained by the nth corresponding filters of the first and second filter units is calculated. If there is an area where the absolute value of the difference is less than or equal to a predetermined threshold Cn, only that area undergoes the LPF of the next stage. In this way, image data is finally generated, in which the absolute value of the difference is smaller than the predetermined threshold in all areas, and all areas have undergone only the minimum and necessary filtering process. This image data is output as the low-frequency image data L[i] of the frame of interest. In this embodiment, an example in which Cn can be set for each stage has been described. However, all thresholds Cn may be set to a single common value C. This is a realistic method which can also obtain a sufficient effect.

Figure 18:
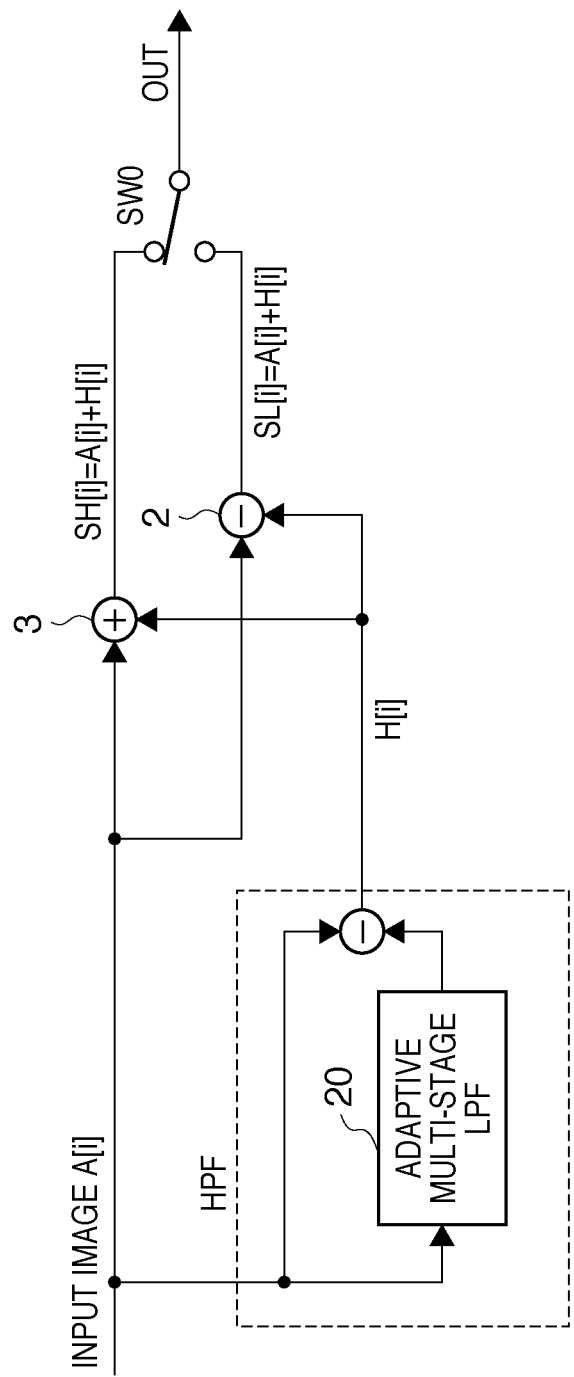
FIG. 18 is a block diagram showing another arrangement of the image processing apparatus according to the second embodiment.

In the example described in the second embodiment, the adaptive multi-stage LPF 20 as shown in FIG. 17 is used in place of the LPF 1 of the first embodiment shown in FIG. 1. However, as shown in FIG. 18, the adaptive multi-stage LPF of the second embodiment and a subtractor may be combined to form an HPF in place of the HPF of the prior art shown in FIG. 6.

Figure 20:
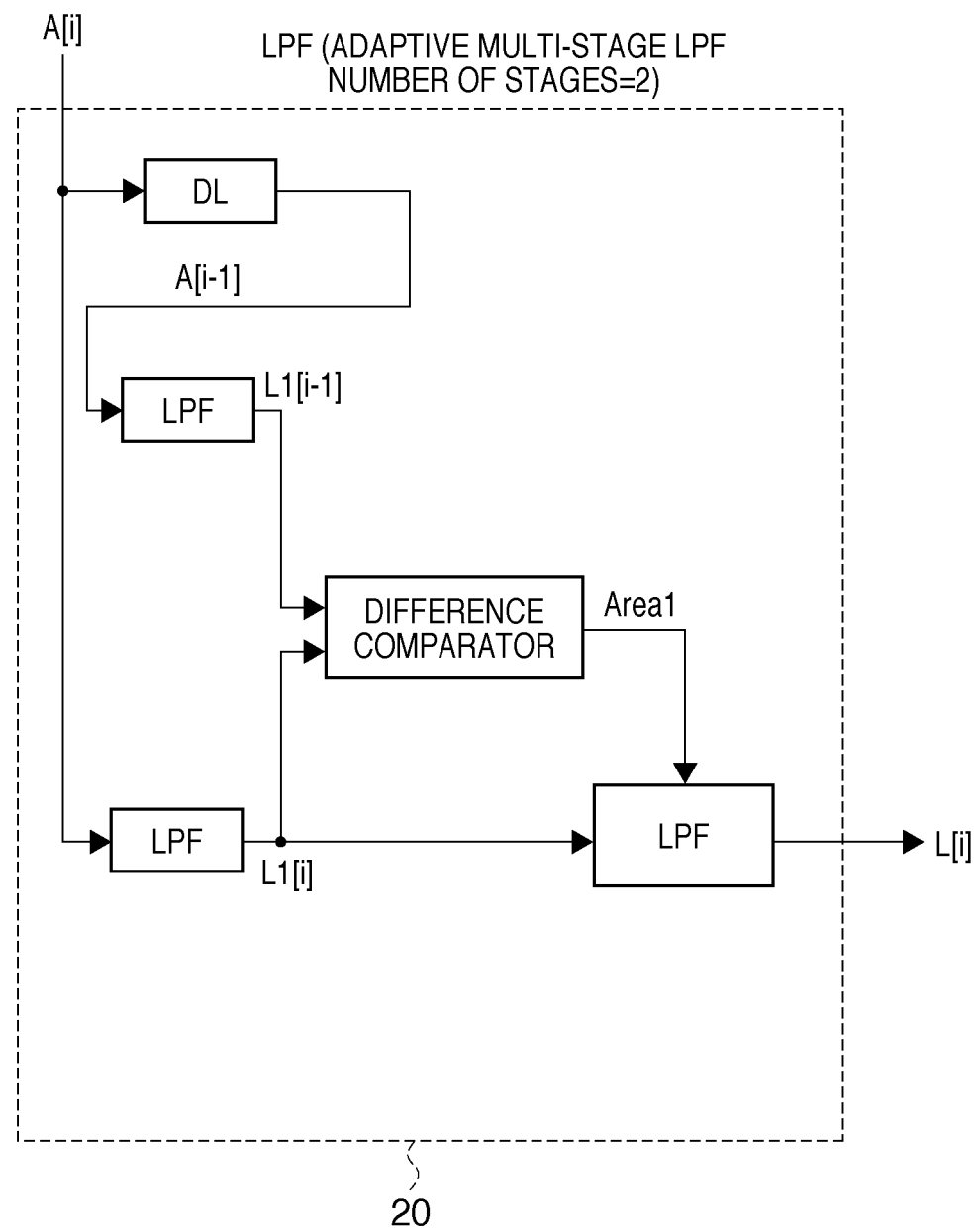
FIG. 20 is a block diagram of an adaptive 2-stage LPF according to the second embodiment.

In the second embodiment, a 4-stage LPF is used. The characteristic can be further improved by using a larger number of stages. In fact, a well-balanced number of stages is preferably set in consideration of, for example, the circuit scale and calculation load. For example, in the smallest scale, the number of stages=2, as shown in FIG. 20. Even this arrangement can provide a better function and effect than the prior art.

The adaptive multi-stage low-pass filter preferably executes the filtering process in accordance with an image portion (e.g., a portion with fast motion or a portion with slow motion). However, the filtering process may be done with an entire image.

FIG. 31 shows another example in which the filtering process is performed for an entire image.

The DL 21 delays input image data by one frame and outputs it. The DL 21 can be formed from a FIFO memory for storing one frame of image data, for example. When the current frame of image data input to the adaptive multi-stage LPF 20 is A[i], the DL 21 outputs the preceding frame A[i−1] of the image data.

The LPFs 22 and 23 are always active, and filter the input image data in accordance with the distance constant value d1.

The LPFs 24 and 26 are activated when a determination signal dif_1 from the difference comparator 25 is "1" to filter the image data from the upstream LPFs 22 and 23 using the distance constant value d2. If the determination signal dif_1 from the difference comparator 25 is "0", the LPFs 24 and 26 do not perform the filtering process.

The LPFs 28 and 29 are activated when a determination signal dif_2 from the difference comparator 27 is "1" to filter the image data from the upstream LPFs 24 and 26 using the distance constant value d3. If the determination signal dif_2 from the difference comparator 27 is "0", the LPFs 28 and 29 do not perform the filtering process.

The LPF 31 is activated when a determination signal dif_3 from the difference comparator 30 is "1" to filter the image data from the upstream LPFs 28 and 29 using the distance constant value d4. If the determination signal dif_3 from the difference comparator 30 is "0", the LPF 31 does not perform the filtering process.

Let X1 and X2 be pixel data output from the LPFs 22 and 23. The difference comparator 25 calculates the absolute value |X1−X2| of the difference, compares the absolute value with the threshold C1, and outputs the comparison result as the determination signal dif_1.

More specifically,
when a condition |X1 − X2| ≦ C1 is satisfied,
dif_1 = "0", and
when a condition |X1 − X2| > C1 is satisfied,
dif_1 = "1"

This also applies to the difference comparators 27 and 30. The difference comparator 27 uses the threshold C2 and outputs the determination result as dif_2. The difference comparator 30 uses the threshold C3 and outputs the determination result as dif_3.

A switch SW1 selects the terminal "1" when the determination signal dif_1 from the difference comparator 25 is "1" and the terminal "0" when the determination signal dif_1 is "0". This also applies to switches SW2 to SW4.

Considering the above explanation, the operation of the adaptive multi-stage LPF 20 shown in FIG. 31, which performs the filtering process for an entire image, will be described below.

The outline will briefly be described first.

The LPF 23 always performs the process for every frame. If the filtering result by the LPF 23 is insufficient, the LPF 26 executes the filtering process. If the filtering result is still insufficient, the filtering process is performed by the LPF 29 and then by the LPF 31.

It is determined in the following way whether filtering by an LPF is sufficient.

The LPFs 22, 24, and 28 filter the preceding frame A[i−1] of the image data. The difference between the filtering result of the current frame A[i] of the image data and the filtering result of the preceding frame is compared with a threshold. If the difference is larger than the threshold, it is determined that the filtering by the LPF is insufficient. On the other hand, if the difference is less than or equal to the threshold, it is determined the filtering by the LPF of the stage is sufficient, and the filtering process result of that stage is output as the image data L[i] that is the output of the adaptive multi-stage LPF 20. The adaptive multi-stage LPF 20 is a 4-stage LPF. Hence, if the determination result dif_3 of the final difference comparator 30 is "1", the filtering result by the LPF 31 is output as the image data L[i] that is the output of the adaptive multi-stage LPF 20.

The filtering process of this embodiment will be described below in accordance with the sequence.

First, the input image A[i] and the immediately preceding frame A[i−1] of the image data pass through the LPFs 22 and 23, respectively. That is, $$L1[i]=LPF1(A[i])$$

$$L1[i-1]=LPF1(A[i-1])$$

Actually, L1[i−1] is already calculated in the output process of the immediately preceding frame. Hence, the calculated data may be saved and loaded from the memory.

The difference comparator 25 calculates the absolute value of the difference between L1[i] and L1[i−1] and compares the absolute value with the threshold constant value C1.

When |L1[i]−L1[i−1]|<C1, the filtering result L1[i] of the current frame is sufficient. Hence, the difference comparator 25 outputs the determination signal dif_1="0". Consequently, the switch SW1 selects the output terminal "0" to output L1[i] as the output L[i] of the adaptive multi-stage LPF 20. When the determination signal dif_1="0", the difference comparator 27 of the next stage unconditionally sets the determination signal dif_2 to "0". This also applies to the difference comparator 30.

On the other hand, when |L1[i]−L1[i−1]|≧C1, the filtering result L1[i] of the current frame is insufficient. Hence, the difference comparator 25 outputs the determination signal dif_1="1". This activates the LPFs 24 and 26. The switch SW1 selects the output terminal "1". The LPFs 24 and 26 filter L1[i1] and L1[i−1], respectively.

The difference comparator 27 calculates the absolute value of the difference between the output L2[i] and L2[i−1] from the LPFs 24 and 26 and compares the absolute value with the threshold constant value C2.

When |L2[i]−L2[i−1]|<C2, the filtering result L2[i] of the current frame is sufficient. Hence, the difference comparator 27 outputs the determination signal dif_2="0". Consequently, the switch SW2 selects the output terminal "0" to output L2[i] as the output L[i] of the adaptive multi-stage LPF 20.

On the other hand, when |L2[i]−L2[i−1]|≧C2, the filtering result L2[i] of the pixel of interest of the current frame is insufficient. Hence, the difference comparator 27 outputs the determination signal dif_2="1". This activates the LPFs 28 and 29. The switch SW2 selects the output terminal "1". The LPFs 28 and 29 filter L2=[i1] and L2[i−1], respectively.

The difference comparator 30 calculates the absolute value of the difference between the output L3[i] and L3[i−1] from the LPFs 28 and 29 and compares the absolute value with the threshold constant value C3.

When |L3[i]−L3[i−1]|<C3, the filtering result L3[i] of the current frame is sufficient. Hence, the difference comparator 30 outputs the determination signal dif_3="0". Consequently, the switch SW3 selects the output terminal "0" to output L3[i] as the output L[i] of the adaptive multi-stage LPF 20.

On the other hand, when |L3[i]−L3[i−1]|≧C3, the filtering result L3[i] of the current frame is insufficient. Hence, the difference comparator 30 outputs the determination signal dif_3="1". This activates the LPF 31. Each of the switches SW3 and SW4 selects the output terminal "1" to output the filtering process result L4[i] by the LPF 31 as the output L[i] of the adaptive multi-stage LPF 20.

As a result, only one of the outputs from the LPFs 23, 26, 29, and 31 is output as the output L[i] of the adaptive multi-stage LPF 20.

The above-described process can be expressed as follows.

The adaptive multi-stage LPF 20 according to the second embodiment includes the first filter unit (LPFs 23, 26, 29, and 31) and the second filter unit (LPFs 22, 24, and 28). Sequentially from the upstream stage, the absolute value of the difference between image data obtained by the nth corresponding filters of the first and second filter units is calculated. The absolute value of the difference is compared with the predetermined threshold Cn to determine whether the difference is less than or equal to the threshold Cn in all areas. When the determination is achieved (when it is determined that the difference is smaller than Cn in all areas) for the first time, image data obtained by the nth filter of the first filter unit is output as the low-frequency image data L[i] of the frame of interest.

Figure 32:
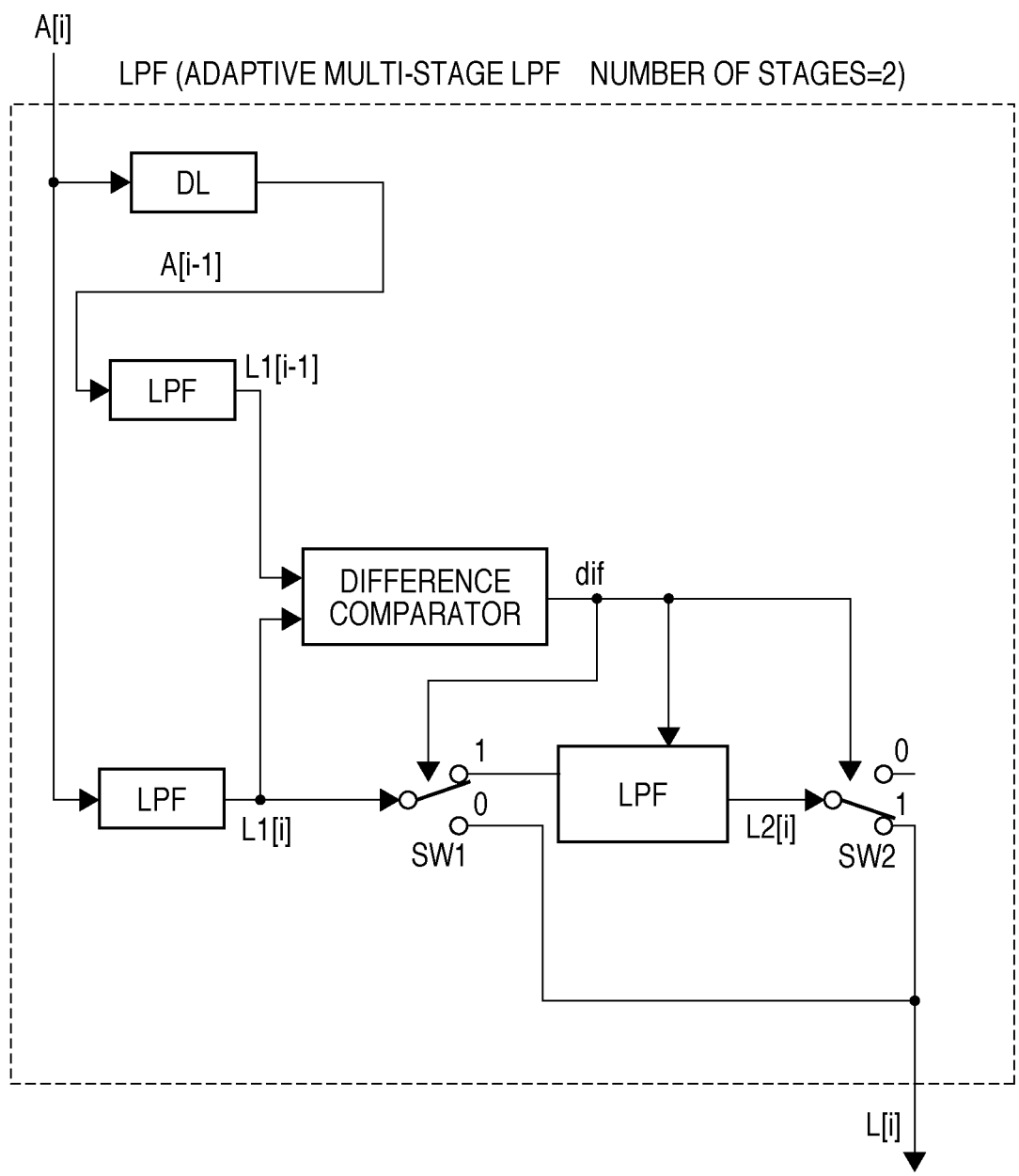
FIG. 32 is a block diagram of an adaptive 2-stage LPF according to the second embodiment, which performs the filtering process for an entire image.

The operation of the adaptive multi-stage LPF shown in FIG. 31, which performs the filtering process for an entire image, has been described above. FIG. 32 is a block diagram of an adaptive multi-stage LPF which performs the filtering process for an entire image when coefficient=2.

As described above, according to the second embodiment, it is possible to mitigate the first and second problems.

<Third Embodiment>

In the third embodiment, a solution to the above-described second problem will be described.

In the above-described second embodiment, the distance constant value d of the LPF is appropriately controlled to suppress the ratio of the high-frequency component from becoming excessively high. That is, this prevents the brightness level of display from being saturated (i.e., SH[i]>100%, or SH[i]<0 mathematically).

The third embodiment proposes a method of preventing a problem even when saturation of the display brightness level (i.e., SH[i]≧100%, or SH[i]<0 mathematically) still occurs after the above-described process. That is, SH[i] and SL[i] which are calculated once are corrected again to prevent any problem.

Figure 21:
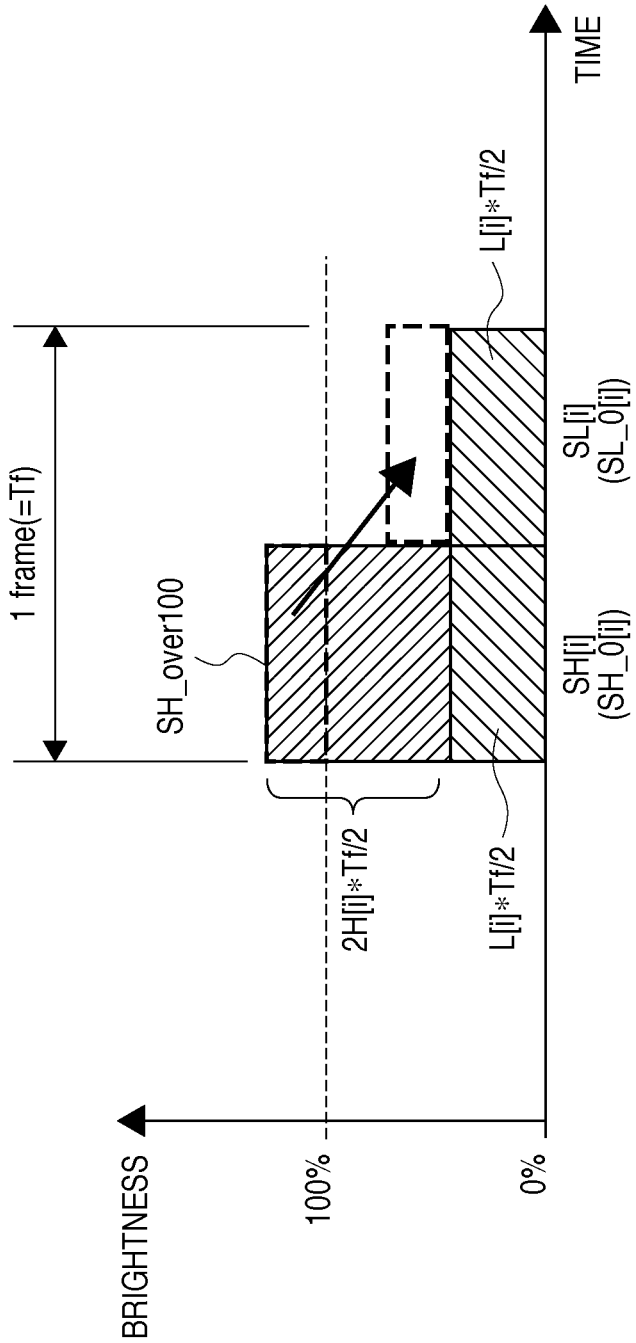
FIG. 21 is a timing chart for explaining process contents according to the third embodiment.
Figure 22:
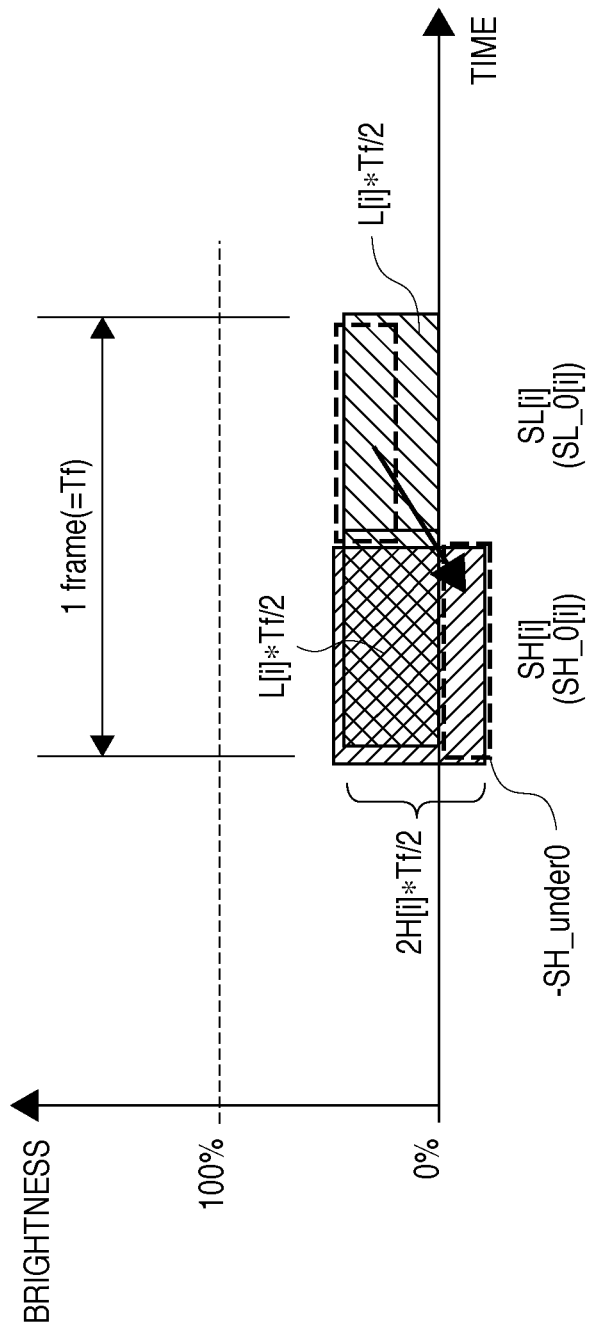
FIG. 22 is a timing chart for explaining process contents according to the third embodiment.

FIGS. 21 and 22 show a case in which the method of the embodiment is applied to the prior art in FIG. 6.

In the prior art shown in FIG. 6, SH[i] and SL[i] can be expressed by $$L[i]=LPF(A[i])$$

$$H[i]=A[i]-L[i]$$

$$SH[i]=L[i]+2H[i]$$

$$SL[i]=L[i]$$

In the third embodiment, correction to be described later is performed for SH[i] and SL[i] obtained by calculations up to this point, thereby generating corrected images SH_0 [i] and SL_0[i]. The values of SH_0[i] and SL_0[i] represent brightness levels to be actually displayed. That is, both SH_0[i] and SL_0[i] are images that are corrected to practically take a value of 0% to 100%. When a pixel value is expressed by 8 bits, "100%" is the upper limit "255" expressed by 8 bits, and "0%" is literally the lower limit "0" of an 8-bit value.

The parameters in FIGS. 21 and 22 will be defined first. When the value of a pixel in spatial high-frequency image data mathematically exceeds 100%, the exceeding part (excess part) is defined as "SH_Over100". If SH is mathematically negative, that is, if 2H is a negative value, and the absolute value of 2H is larger than L, a negative part smaller than the lower limit is defined as "−SH_Under0".

In the third embodiment, as shown in FIG. 21, when a pixel in spatial high-frequency image data has SH_Over100, SH_Over100 is subtracted from the pixel and added to a pixel at the same position in spatial low-frequency image data. That is, SH_Over100 is moved. Similarly, as shown in FIG. 22, to compensate for −SH_Under0, the same value is moved from the second sub-frame to the first sub-frame.

This operation can actually be expressed in, for example, the C language as follows.

```
if (SH > 100){
    SH_over100 = SH-100 ; SH_under0 = 0 ; SH = 100 ;}
else if (SH < 0){
    SH_over100 = 0 ; SH_under0 = −SH ; SH = 0 ;}
else {
    SH_over100 = 0 ; SH_under0 = 0 ;}
SH_0[i] = SH[i] − SH_over100 + SH_under0 ;
SL_0[i] = SL[i] + SH_over100 − SH_under0 ;
```

With this process, if the display brightness level is saturated (i.e., if SH[i]≧100%, or SH[i]<0 mathematically), the above-described correction can be performed to replace the data with SH_0[i] and SL_0[i]. It is therefore possible to prevent this problem in the image.

Figure 23:
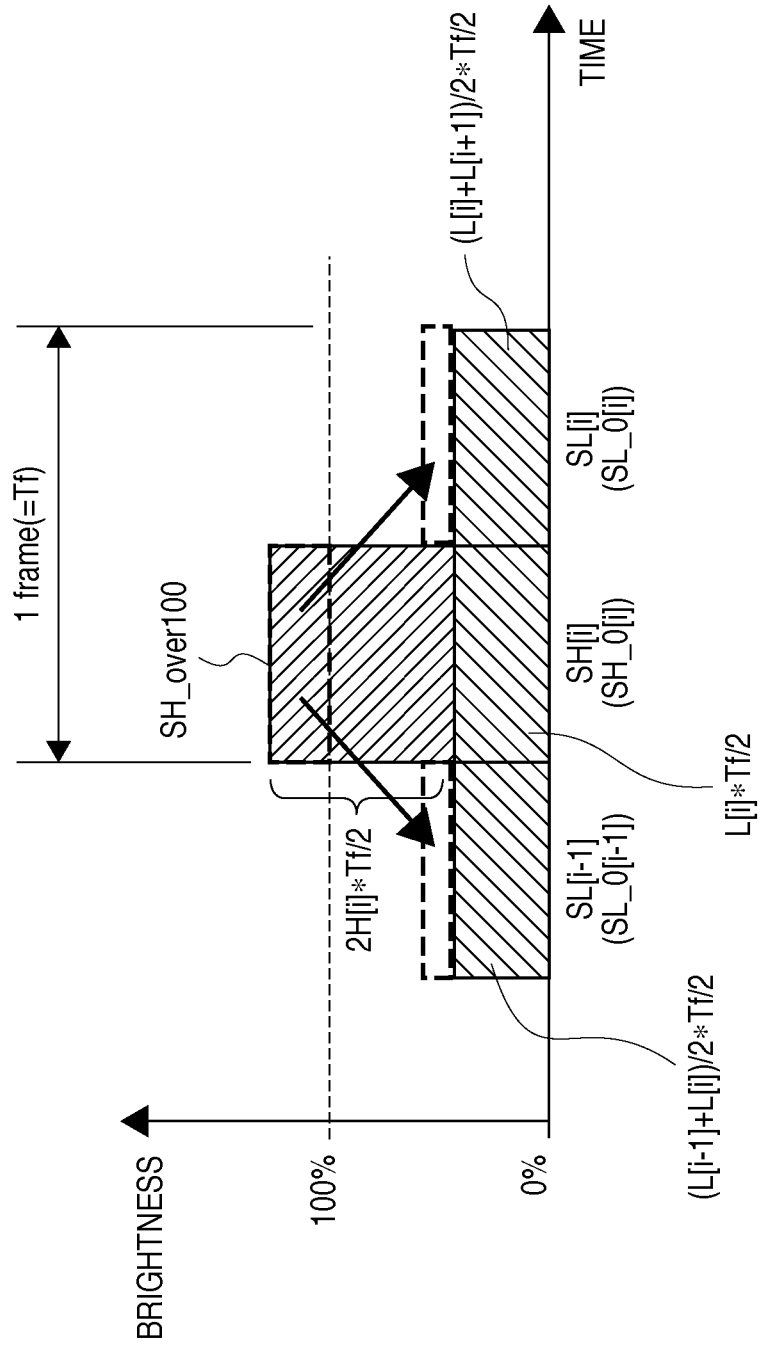
FIG. 23 is a timing chart for explaining preferable process contents according to the third embodiment.
Figure 24:
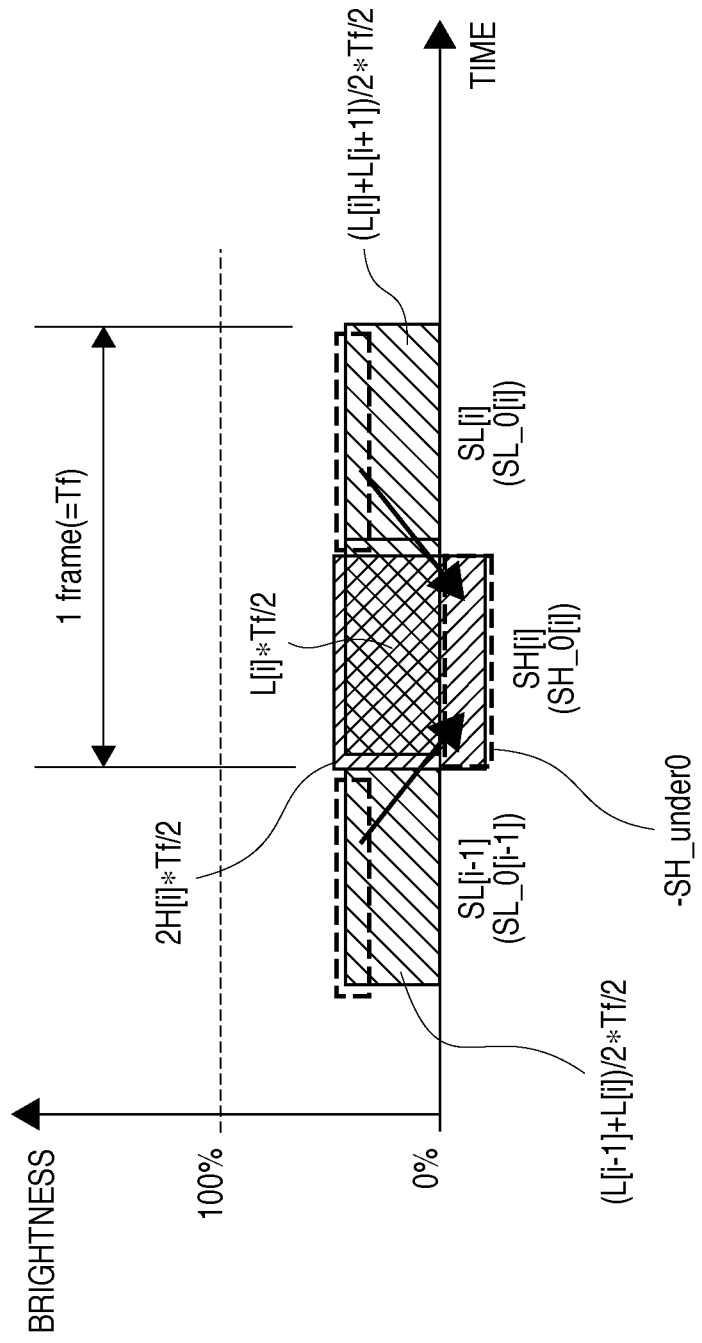
FIG. 24 is a timing chart for explaining preferable process contents according to the third embodiment.

FIGS. 23 and 24 show a case in which the method described in the third embodiment is applied to the first embodiment in FIG. 1.

In the first embodiment shown in FIG. 1, SH[i] and SL[i] can be expressed by $$L[i]=LPF(A[i])$$

$$H[i]=A[i]-L[i]$$

$$SH[i]=L[i]+2H[i]$$

$$SL[i]=\{L[i]+L[i-1]\}/2$$

In the third embodiment, the correction process is performed for SH[i] and SL[i] obtained by calculations up to this point, thereby obtaining results SH_0[i] and SL_0[i]. The values of SH_0[i] and SL_0[i] represent brightness levels to be actually displayed and take a value of 0% to 100%.

The parameters in FIGS. 23 and 24 will be defined first. When the image data SH (=L+2H) mathematically exceeds 100%, the actually exceeding part is defined as "SH_Over100". If SH is mathematically negative (i.e., if 2H is negative, and its absolute value is larger than L), the actual negative part is defined as "−SH_Under0".

In the third embodiment, as shown in FIG. 23, half of SH_Over100 is moved from the first sub-frame to the second sub-frame. Additionally, the remaining half is moved to the immediately preceding second sub-frame.

Similarly, as shown in FIG. 24, to compensate for SH_Under0, a value corresponding to half of the value is moved from the second sub-frame to the first sub-frame of interest. Additionally, a value corresponding to the remaining half is moved from the immediately preceding second sub-frame to the first sub-frame of interest.

This operation can actually be expressed in, for example, the C language, as follows.

```
if (SH > 100){
    SH_over100 = SH-100 ; SH_under0 = 0 ; SH = 100 ;}
else if (SH < 0){
    SH_over100 = 0 ; SH_under0 = -SH ; SH = 0 ;}
else {
    SH_over100 = 0 ; SH_under0 = 0 ;}
SH_0[i] = SH[i] - SH_over100 + SH_under0 ;
SL_0[i] = SL[i] + (1/2) * SH_over100 - (1/2) *
SH_under0 ;
SL_0[i-1] = SL[i] + (1/2) * SH_over100 - (1/2) *
SH_under0 ;
```

With this process, if the display brightness level is saturated (i.e., if $SH[i] \geq 100\%$, or $SH[i]<0$ mathematically), the above-described correction can be done to replace the data with SH_0[i] and SL_0[i]. It is consequently possible to prevent this problem in the image. Even when the method described in this embodiment is applied, the temporal center of gravity of the spatial high-frequency component and that of the spatial low-frequency component do not change. Hence, no shift occurs between the display position of the spatial high-frequency component and that of the spatial low-frequency component in an image obtained in pursuit. It is therefore possible to prevent any operation error caused by the saturation of the brightness level while preventing distortion such as tail-blurring in an image observed in pursuit.

<Fourth Embodiment>

In the fourth embodiment, an example of a solution to the above-described first and second problems will be described.

In the fourth embodiment, an input image is separated into a plurality of spatial frequency components, and the display level is distributed (multiplied) to a plurality of sub-frames so that the temporal centers of gravity of the components match. This improves motion blur, double blurring and flicker. In the above-described first to third embodiments, one input frame is subjected to double-rate conversion (i.e., separated into two sub-frames), and spatial frequency separation is done to separate image data into a spatial high-frequency component and a spatial low-frequency component.

Let N be the magnification of the number of frames, and R be the number of frequency bands for spatial frequency separation. In the above-described embodiments, the frame frequency is doubled (N=2), or the spatial frequency band is separated into two bands (R=2), that is, a high-frequency component and a low-frequency component.

However, the present invention does not limit the number of sub-frames (i.e., does not limit N of "Nx-rate" to "2"). In spatial frequency band separation as well, the present invention does not limit the number of bands (i.e., does not limit R of "R bands" to "2").

In this embodiment, conditions for obtaining the same effect as described above even when the frame frequency of an input image is multiplied by N (or separated into N sub-frames), and the input image is separated into R spatial frequency bands will be described. N and R are positive integers greater than or equal to 2.

N is not limited to 2 and can be 3 or more to obtain the same effect. If anything, large N is preferable for satisfying the condition of the present invention because the degree of freedom in distribution is high.

R is designed such that when an input image is separated into R spatial frequency bands, two adjacent bands (e.g., J and (J+1)) always have the above-described relationship for R=2. In this case, the same relationship holds in all bands from the first to Rth bands. That is, the R band components are made to have such a relationship that the temporal distribution of the band component images becomes smaller in descending order of spatial frequency (in other words, the temporal distribution becomes larger in ascending order of spatial frequency), and the temporal centers of gravity of all band components match. At this time, the effect of the present invention, that is, the effect of improving motion blur, preventing flicker, and reducing distortion such as tail-blurring is obtained. That is, in the present invention, even when N and R are generalized, the same effect as in the above-described arrangements with N=2 and R=2 is obtained.

Even in spatial frequency separation, the number of bands is not limited. In the fourth embodiment, N=5. This is equivalent to a process of, for example, converting the frame rate of an image having a frame frequency of 24 Hz (generally corresponding to a moving image of a movie) into a 5x frame rate of 120 Hz. The number R of bands will be exemplified as R=3 which does not make the scale of circuit and calculation so large. That is, an example in which the spatial frequency is separated into three bands: High, Middle, and Low will be described.

Figure 26:
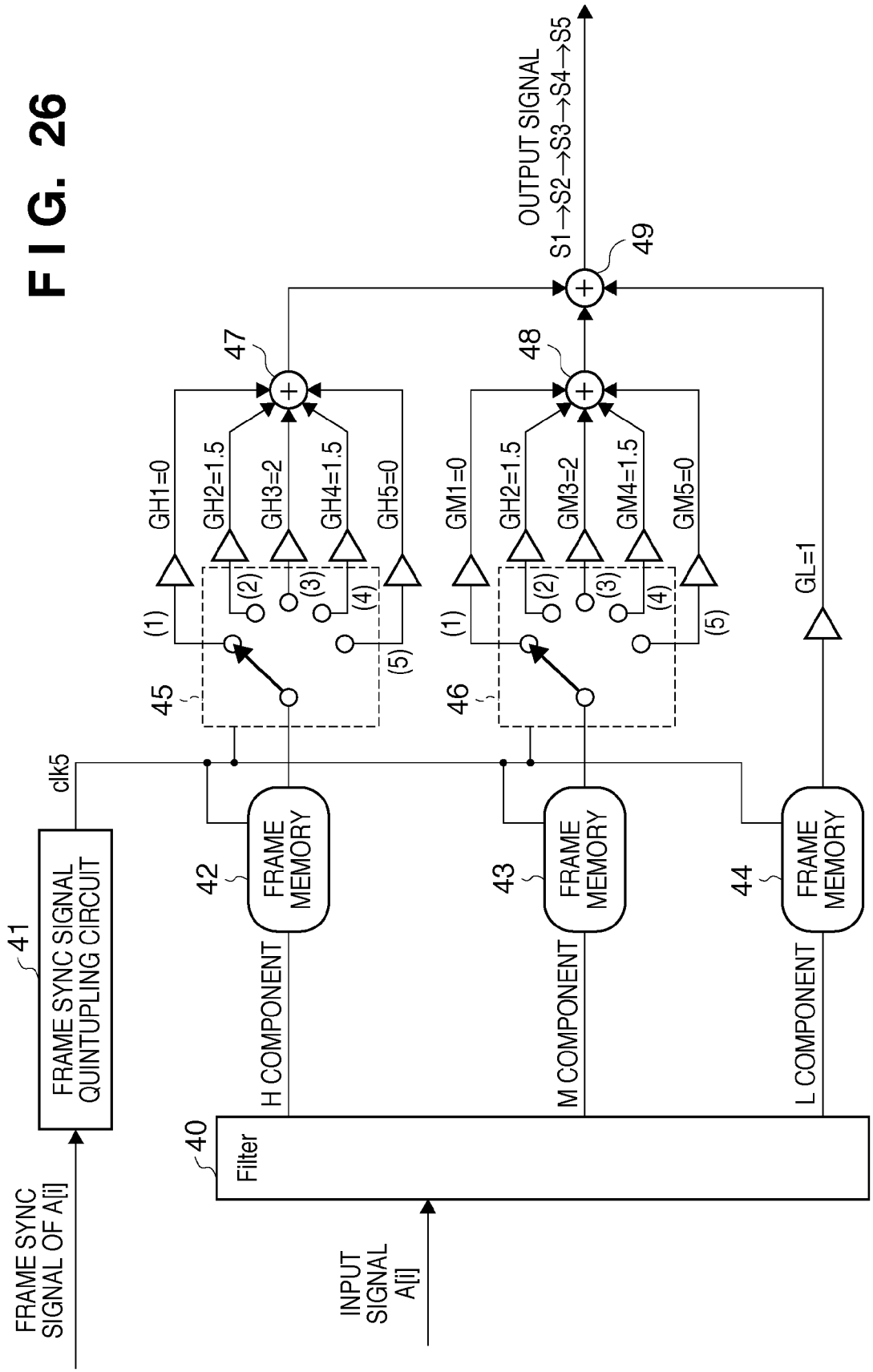
FIG. 26 is a block diagram showing the arrangement of an image processing apparatus according to the fourth embodiment.

FIG. 26 is a block diagram of the fourth embodiment. FIG. 25 shows the correction intensities (multiplier coefficients) of the display level of the spatial frequency band of each sub-frame according to the fourth embodiment.

The operation of the arrangement in FIG. 26 will be described below. A filter 40 receives image data A[i] of one frame at a frame rate of 24 Hz. The filter 40 separates the input image data into three spatial frequency band components H, M, and L based on two distance constant values d1 and D2 (e.g., d1=3 pixels, and d2=8 pixels). The components are temporarily saved in frame memories 42 to 44.

A frame sync signal quintupling circuit 41 quintuples the frame sync signal of the input image A[i] to generate and output clk5.

Each of switches 45 and 46 is reset by the frame sync signal of the image A[i] and selects the output terminal in the order of (1)->(2)->(3)->(4)->(5) in accordance with clk5.

The H component temporarily saved in the frame memory 42 is read out five times in accordance with clk5 and sent to the switch 45. The switch 45 is connected to the output terminal (1) at the first stage of clk5. The output terminal then switches to (2), (3), (4), and (5) in this order. The M component saved in the frame memory 43 is also read out five times. The output terminal of the switch 46 sequentially switches from (1) to (5). The L component temporarily saved in the frame memory 44 is also read out five times.

Multipliers GH1 to GH5 which multiply the high-frequency components by their gains {0, 0.5, 4.0, 0.5, 0} shown in FIG. 25 are provided immediately after the output terminals of the switch 45.

Similarly, multipliers GM1 to GM5 which multiply the M components by their gains {0, 1.5, 2.0, 1.5, 0} shown in FIG. 25 are provided immediately after the output terminals of the switch 46.

That is, in reading out a component N times (in the embodiment, N=5), the gain (multiplier coefficient) gradually becomes large. The gain is maximized at the intermediate time (in the embodiment, third time) and then gradually becomes small.

A multiplier using a gain {1, 1, 1, 1, 1} is provided immediately after the frame memory 44. The gain of the low-frequency component does not change. Hence, one multiplier suffices, as shown in FIG. 26.

Actually, the same arrangements as the switches 45 and 46 and the succeeding multipliers are necessary even immediately after the frame memory 44. However, the arrangements are not shown because the coefficient does not change in this case.

Adders 47 to 49 add the multiplied image data. As a result, S1[i], S2[i], S3[i], S4[i], and S5[i] are output from the first to fifth stages of clk in this order and displayed, which are given by $$S1[i]=L[i]$$

$$S2[i]=L[i]+1.5M[i]+0.5H[i]$$

$$S3[i]=L[i]+2M[i]+4H[i]$$

$$S4[i]=L[i]+1.5M[i]+0.5H[i]$$

$$S5[i]=L[i]$$

(where [i] is the frame number of the corresponding input image A[i])

In this embodiment, the plurality of spatial frequency band components are set such that the temporal distribution becomes smaller in descending order of spatial frequency (in other words, the temporal distribution becomes larger in ascending order of spatial frequency), and the temporal centers of gravity of all components match, as described above. FIG. 25 complies with the conditions. The coefficients shown in FIG. 25 are bilaterally symmetrical for all the H, M, and L components. The temporal center of gravity is located at the center (third sub-frame), and the temporal centers of gravity of all components match. Weight concentration on a portion close to the intermediate frame is most conspicuous among the coefficients of the H component. The relationship of the degree of concentration is represented by H>M>L. As for the L component, the weight is flat. That is, the temporal distribution becomes smaller in descending order of spatial frequency (larger in ascending order of spatial frequency), as can be seen. The temporal distribution can be expressed in detail in the following way using the example of the coefficient array in FIG. 25. The ratio of the H coefficient to the M coefficient increases toward the third sub-frame at the center and is maximized at the third sub-frame. The ratio of the M coefficient to the L coefficient also increases toward the third sub-frame at the center and is maximized at the third sub-frame. The relationship between the L and M coefficients is also the same. FIG. 25 shows an example of a coefficient array that can be generalized in this way.

In this display, when an object that moves in an image is pursued, the H, M, and L components of the observed image have no spatial shift. Hence, an image free from distortion such as ghosting or tail-blurring is observed.

The four embodiments of the present invention have been described above. In the embodiments, the output destination of each of the finally obtained Nx-rate frames is not mentioned specifically. The output destination can be either a hold- or impulse-type display device. The output destination is not limited to a display device. Instead, the data may be stored in a storage medium such as a DVD or a storage device such as a hard disk as a moving image file.

Like the above-described modification of the first embodiment, the second and subsequent embodiments also allow a computer program to implement an equivalent process.

Normally, a computer program is stored in a computer-readable storage medium such as a CD-ROM. The storage medium is set in the read device (e.g., CD-ROM drive) of a computer, and the program is made executable by copying or installing it in a system. Hence, such a computer-readable storage medium is also incorporated in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-207181, filed Aug. 8, 2007, which is hereby incorporated by reference herein in its entirety.

What is claimed is:

1. An image processing apparatus configured to output moving image data which is input at m frames per unit time as output moving image data at N×m (N>2) frames per unit time, comprising:
   a filter unit configured to separate image data from an input frame of interest into spatial high-frequency component image data and spatial low-frequency component image data;
   a storage unit configured to store the spatial high-frequency and spatial low-frequency component image data obtained by said filter unit;
   a read unit configured to read the spatial high-frequency component image data and the spatial low-frequency component image data from said storage unit N times;
   a multiplication unit configured to, multiply the spatial high-frequency component image data and the spatial low-frequency component image data by predetermined multiplier coefficients which are set to make a temporal center of gravity of the spatial high-frequency component image data match that of the spatial low-frequency component image data and make temporal distribution of the spatial high-frequency component image data smaller than that of the spatial low-frequency component image data;
   an addition unit configured to add the spatial high-frequency component image data and the spatial low-frequency component image data after multiplication by said multiplication unit every time the data is read; and
   an output unit configured to output the summed image data from said addition unit.

2. The apparatus according to claim 1, wherein said filter unit comprises:
   a memory configured to store image data of a frame immediately preceding the input frame of interest;
   first filter unit including a plurality of filters which are connected in a daisy chain for the image data of the frame of interest, and whose upper limit values of the frequency range to be filtered become smaller as the filter position goes downstream;
   second filter unit including a plurality of filters which are connected in a daisy chain for the image data of the frame immediately preceding the frame of interest stored in said memory, and whose upper limit values of the frequency range to be filtered become smaller as the filter position goes downstream; and unit configured to output the image data obtained by the nth filter of said first filter unit as the low-frequency component image data of the frame of interest when an absolute value of a difference between image data obtained by an nth filter of said first filter unit and image data obtained by an nth filter of said second filter unit becomes equal to or less than a preset threshold Cn for the first time.

3. A non-transitory computer-readable storage medium storing a computer program which when loaded into a computer and executed, causes the computer to function as an image processing apparatus as claimed in claim 1.

4. An image processing apparatus configured to receive input moving image data at m frames per unit time and output moving image data at 2 m frames per unit time, comprising:
 a receiving unit configured to receive input image data of each frame;
 a filter unit configured to separate image data of an input frame of interest into spatial high-frequency component image data and spatial low-frequency component image data;
 a storage unit configured to store the input image data, the spatial high-frequency component image data, and the spatial low-frequency component image data;
 a calculation unit configured to calculate low-frequency averaged image data that is an averaged value of low-frequency component image data of an input frame temporally adjacent the frame of interest and the low-frequency component image data of the frame of interest stored in said storage unit;
 a generation unit configured to generate high-frequency emphasized image data based on the low-frequency component image data and the high-frequency component image data; and
 an output unit configured to output, sequentially for each frame, the high-frequency emphasized image data and the low-frequency averaged image data obtained by said calculation unit.

5. The apparatus according to claim 4, wherein said generation unit is adapted to calculate the high-frequency emphasized image data SH[i] using the expression $$SH[i]=L[i]+2\times H[i],$$

and said calculation unit is operable to calculate the low-frequency averaged image data SL[i] using the expression $$SL[i]=\{L[i]+L[i-1]\}/2,$$

where A[i] is image data of an input ith frame of interest, L[i] is low-frequency component image data obtained from the image data A[i], and H[i] is high-frequency component image data obtained from the image data A[I].

6. The apparatus according to claim 4, further comprising correction unit configured to subtract a value of an excess part from the pixel of interest, and add the value of the excess part to a pixel at the same position as the pixel of interest in the low-frequency image data of the frame of interest, if a pixel value of a pixel of interest of the high-frequency emphasized image data is larger than an upper limit value allowable for the pixel value, and if the pixel value of the pixel of interest of the high-frequency emphasized image data is smaller than a lower limit value allowable for the pixel value, to set the pixel value of the pixel of interest to the lower limit value, and subtract a value necessary to set the pixel value of the pixel of interest to the lower limit value from the pixel at the same position as the pixel of interest in the low-frequency image data, thereby correcting the high-frequency emphasized image data and the low-frequency image data obtained by said calculation unit, wherein said output unit outputs the high-frequency emphasized image data and the low-frequency image data which are corrected by said correction unit.

7. A non-transitory computer-readable storage medium storing a computer program which when loaded into a computer and executed, causes the computer to function as an image processing apparatus as claimed in claim 4.

8. The apparatus according to claim 2, wherein said filter unit comprises:
 a memory configured to store image data of a frame immediately preceding the input frame of interest;
 first filter unit including a plurality of filters which are connected in a daisy chain for the image data of the frame of interest, and whose upper limit values of the frequency range to be filtered become smaller as the filter position goes downstream;
 second filter unit including a plurality of filters which are connected in a daisy chain for the image data of the frame immediately preceding the frame of interest stored in said memory, and whose upper limit values of the frequency range to be filtered become smaller as the filter position goes downstream; and
 unit configured to output the image data obtained by the nth filter of said first filter unit as the low-frequency component image data of the frame of interest when an absolute value of a difference between image data obtained by an nth filter of said first filter unit and image data obtained by an nth filter of said second filter unit becomes equal to or less than a preset threshold Cn for the first time.

9. The apparatus according to claim 2, wherein if there is a specific area where the absolute value of the difference between the image data obtained by the nth filter of said first filter unit and the image data obtained by the nth filter of said second filter unit is greater than the preset threshold Cn, an (n+1)th filter of said first filter unit and an (n+1)th filter of said second filter unit perform a filtering process for the specific area.

10. An image processing apparatus configured to output moving image data which is input at m frames per unit time as output moving image data containing N×m (N≧2) frames per unit time, comprising:
 filter unit configured to separate input moving image data of a frame of interest into R (R≧2) spatial frequency band component images;
 storage unit configured to store the R image data components obtained by said filter unit;
 reading unit configured to read the R image data components from said storage unit N times;
 multiplication unit configured to multiply the R image data components by predetermined multiplier coefficients which are set to make the temporal centers of gravity of the R image data components match, and make the temporal distribution of the R image data components smaller in ascending order of the spatial frequency of the component image;
 addition unit configured to adds the R spatial frequency band image data components after multiplication by said multiplication unit every time said reading unit reads the R spatial frequency band image data components; and
 output unit which outputs the summed image data from said addition unit.

11. A non-transitory computer-readable storage medium storing a computer program which when loaded into a computer and executed, causes the computer to function as an image processing apparatus as claimed in claim 10.

12. An image processing apparatus configured to output moving image data which is input at m frames per unit time as output moving image data at N×m (N≧2) frames per unit time, comprising:
    filter unit configured to separate an image of a frame of interest into a spatial high-frequency image data component and a spatial low-frequency image data component;
    storage unit configured to store each spatial frequency image data component obtained by said filter unit;
    reading unit configured to read the spatial high-frequency image data component and the spatial low-frequency image data component from said storage unit N times;
    multiplication unit configured to multiply the spatial high-frequency image data component and the spatial low-frequency image data component by predetermined multiplier coefficients which are set to allocate the low-frequency image data component to a larger number of frames than the high-frequency image data component;
    addition unit which adds the spatial high-frequency image data component and the spatial low-frequency image data component after multiplication by said multiplication unit every time said reading unit reads out the spatial high-frequency image data component and the spatial low-frequency image data component; and
    output unit configured to output the summed image data from said addition unit.

13. A non-transitory computer-readable storage medium storing a computer program which when loaded into a computer and executed, causes the computer to function as an image processing apparatus as claimed in claim 12.

14. A method of controlling an image processing apparatus which outputs moving image data input at m frames per unit time as output moving image data at N×m (N≧2) frames per unit time, the method comprising:
    separating an image of a frame of interest into a spatial high-frequency image data component and a spatial low-frequency image data component;
    storing each spatial frequency image data component obtained in the filtering step in a storage unit;
    reading the spatial high-frequency image data component and the spatial low-frequency image data component from the storage unit N times;
    multiplying the spatial high-frequency image data component and the spatial low-frequency image data component by predetermined multiplier coefficients which are set to make a temporal center of gravity of the spatial high-frequency image data component match that of the spatial low-frequency image data component and make the temporal distribution of the spatial high-frequency image data component smaller than that of the spatial low-frequency image data component;
    adding the spatial high-frequency image data component and the spatial low-frequency image data component after multiplication every time the spatial high-frequency image data component and the spatial low-frequency image data component are read; and
    outputting the image data summed in the adding step.

15. A method of controlling an image processing apparatus which inputs moving image data containing m frames per unit time and outputs moving image data containing 2 m frames per unit time, the method comprising:
    inputting image data of each frame;
    separating image data of an input frame of interest into a spatial high-frequency image data component and a spatial low-frequency image data component;
    storing a low-frequency image data component of an immediately preceding frame of the frame of interest in a storage unit;
    calculating a low-frequency image data average that is an averaged value of the low-frequency image data component of a frame input next to the frame of interest obtained in the filtering step and the low-frequency image data component stored in the storage unit; and
    sequentially outputting for each frame, high-frequency emphasized image data generated based on the low-frequency image data component and the high-frequency image data component, and the low-frequency image data average.

16. A method of controlling an image processing apparatus which outputs moving image data input at m frames per unit time as output moving image data at N×m (N≧2) frames per unit time, the method comprising:
    separating the input moving image data of a frame of interest into R (R≧2) spatial frequency band component images;
    storing the R image data components obtained in a storage unit;
    reading the R image data component from the storage unit N times;
    multiplying the R image data components by predetermined multiplier coefficients which are set to make the temporal centers of gravity of the R image data components match, and make the temporal distribution of the R image data components smaller in ascending order of the spatial frequency of the component image;
    adding the R spatial frequency band image data components after multiplication every time the R spatial frequency band image data components are read; and
    outputting the summed image data from the addition.

17. A method of controlling an image processing apparatus which outputs moving image data input at m frames per unit time as output moving image data containing N×m (N≧2) frames per unit time, the method comprising:
    separating an input image of a frame of interest into a spatial high-frequency image data component and a spatial low-frequency image data component;
    storing each spatial frequency image data component obtained in a storage unit;
    reading the spatial high-frequency image data component and the spatial low-frequency image data component from the storage unit N times;
    multiplying the spatial high-frequency image data component and the spatial low-frequency image data component by predetermined multiplier coefficients which are set to allocate the low-frequency image data component to a larger number of frames than the high-frequency image data component;
    adding the spatial high-frequency image data component and the spatial low-frequency image data component after multiplication every time the spatial high-frequency image data component and the spatial low-frequency image data component are read; and
    outputting the image data summed in the addition.

* * * * *